(12) United States Patent
Pilcher et al.

(10) Patent No.: US 11,039,575 B2
(45) Date of Patent: *Jun. 22, 2021

(54) EXTERNAL BELT GUIDE FOR ROUND BALER

(71) Applicant: Deere & Company, Moline, IL (US)

(72) Inventors: Steven R. Pilcher, Bloomfield, IA (US); Henry D. Anstey, Ottumwa, IA (US)

(73) Assignee: DEERE & COMPANY, Moline, IL (US)

(*) Notice: Subject to any disclaimer, the term of this patent is extended or adjusted under 35 U.S.C. 154(b) by 300 days.

This patent is subject to a terminal disclaimer.

(21) Appl. No.: 16/020,045

(22) Filed: Jun. 27, 2018

(65) Prior Publication Data

US 2018/0303038 A1 Oct. 25, 2018

Related U.S. Application Data

(63) Continuation-in-part of application No. 15/883,735, filed on Jan. 30, 2018.

(60) Provisional application No. 62/462,997, filed on Feb. 24, 2017.

(51) Int. Cl.
*A01F 15/18* (2006.01)
*A01F 15/07* (2006.01)

(52) U.S. Cl.
CPC .......... *A01F 15/18* (2013.01); *A01F 15/0715* (2013.01); *A01F 2015/077* (2013.01); *A01F 2015/078* (2013.01)

(58) Field of Classification Search
CPC ...... A01F 15/08; A01F 15/0715; A01F 15/18; A01F 15/106; A01F 2015/0795; A01F 2015/078; A01F 2015/0735; A01F 2015/077; A01F 15/071; B65G 15/64; B65G 15/62; B65G 39/16
USPC .......................................................... 100/88
See application file for complete search history.

(56) References Cited

U.S. PATENT DOCUMENTS

| 2,797,794 | A | * | 7/1957 | Bradley | ................. B65G 39/16 198/806 |
| 4,205,513 | A | * | 6/1980 | Shokoples | .......... A01F 15/0765 100/5 |
| 4,428,282 | A | * | 1/1984 | Anstey | ................... A01F 15/07 100/88 |
| 4,444,098 | A | * | 4/1984 | Soteropulos | ............ A01F 15/07 100/88 |

(Continued)

FOREIGN PATENT DOCUMENTS

| EP | 2266386 B2 | * | 9/2017 | ......... A01F 15/0715 |
| WO | WO-2013124836 A1 | * | 8/2013 | ......... A01F 15/0715 |

OTHER PUBLICATIONS

Extended European Search Report for European Patent Application No. EP 18 15 8031 dated Jul. 12, 2018, 8 pages.

*Primary Examiner* — Adam J Eiseman
*Assistant Examiner* — Mohammed S. Alawadi
(74) *Attorney, Agent, or Firm* — Klintworth & Rozenblat IP LLP

(57) ABSTRACT

A belt guide for a baler having a bale forming chamber with at least one belt to form a bale of crop material includes a guide. The guide includes a guide protrusion that extends inwardly toward the bale forming chamber proximate an edge of the at least one belt. The belt guide is coupled to the baler external to the bale forming chamber.

20 Claims, 13 Drawing Sheets

(56) References Cited

U.S. PATENT DOCUMENTS

| | | | | |
|---|---|---|---|---|
| 4,697,402 | A * | 10/1987 | Anstey | A01F 15/0715 53/506 |
| 4,707,974 | A * | 11/1987 | Harthoorn | A01F 15/07 100/88 |
| 4,890,449 | A * | 1/1990 | Hering | A01F 15/07 56/341 |
| 4,969,315 | A * | 11/1990 | Ardueser | A01F 15/0715 53/389.2 |
| 5,129,207 | A * | 7/1992 | Butler | A01F 15/0715 53/118 |
| 5,129,208 | A * | 7/1992 | Van Zee | A01F 15/0715 53/118 |
| 5,152,123 | A * | 10/1992 | Viaud | A01F 15/0715 100/4 |
| 5,483,785 | A * | 1/1996 | DiCarlo | A01F 15/071 53/211 |
| 6,006,504 | A * | 12/1999 | Myers | A01F 15/0715 53/556 |
| 6,272,816 | B1 * | 8/2001 | Viaud | A01F 15/0715 242/441.4 |
| 6,594,975 | B2 * | 7/2003 | Anstey | A01F 15/0715 53/118 |
| 6,606,843 | B1 * | 8/2003 | Anstey | A01F 15/0715 53/556 |
| 6,622,463 | B1 * | 9/2003 | Anstey | A01F 15/12 53/118 |
| 7,181,900 | B2 * | 2/2007 | Hood | A01F 15/0715 100/88 |
| 7,311,040 | B2 * | 12/2007 | Viaud | A01F 15/07 100/87 |
| 8,037,814 | B1 * | 10/2011 | Smith | B30B 9/3082 100/88 |
| 9,078,399 | B2 * | 7/2015 | Hubach | A01F 15/18 |
| 9,415,888 | B2 * | 8/2016 | Smith | A01F 15/0715 |
| 2002/0189197 | A1 * | 12/2002 | Anstey | A01F 15/0715 53/118 |
| 2005/0109007 | A1 * | 5/2005 | Hood | A01F 15/0715 56/341 |
| 2012/0132090 | A1 * | 5/2012 | Pourchet | A01F 15/0883 100/88 |
| 2012/0240527 | A1 * | 9/2012 | Herron | A01F 15/0715 53/461 |
| 2013/0032047 | A1 * | 2/2013 | Marques | A01F 15/18 100/88 |
| 2013/0192959 | A1 * | 8/2013 | Kitamura | B65H 5/025 198/806 |
| 2013/0233680 | A1 * | 9/2013 | Sharp | B65G 15/60 198/806 |
| 2014/0346015 | A1 * | 11/2014 | Moon | B65G 15/60 198/835 |
| 2015/0210475 | A1 * | 7/2015 | Batchelder | B65G 45/12 198/497 |
| 2016/0137372 | A1 * | 5/2016 | Anstey | A01F 15/0715 428/190 |
| 2018/0310482 | A1 * | 11/2018 | Reijersen Van Buuren | A01F 15/0715 |

* cited by examiner

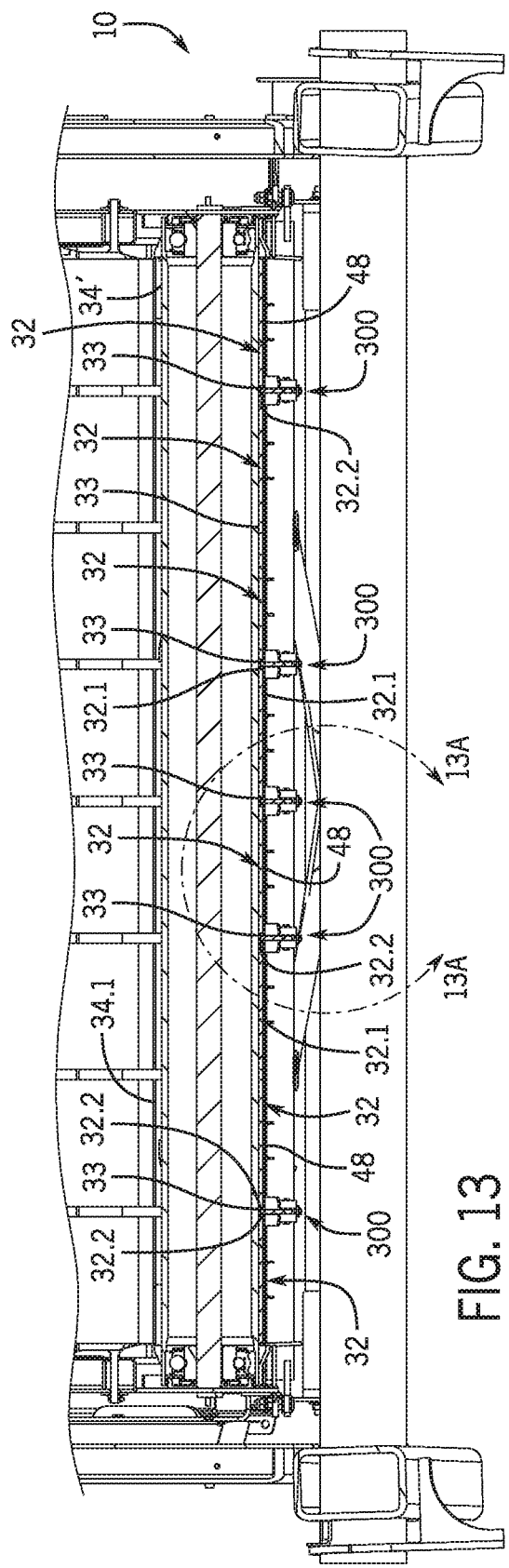
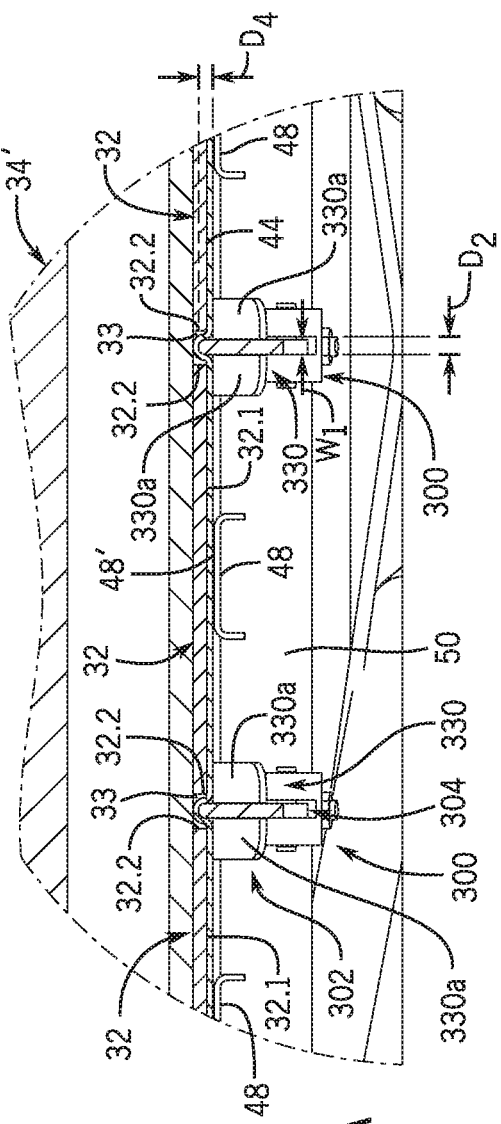
FIG. 13
FIG. 13A

EXTERNAL BELT GUIDE FOR ROUND BALER

CROSS-REFERENCE TO RELATED APPLICATION(S)

This application is a continuation-in-part of U.S. patent application Ser. No. 15/883,735 filed on Jan. 30, 2018, which claims the benefit of U.S. Provisional Application No. 62/462,997, filed on Feb. 24, 2017. The relevant disclosure of each of the above referenced applications is incorporated herein by reference.

STATEMENT OF FEDERALLY SPONSORED RESEARCH OR DEVELOPMENT

Not applicable.

FIELD OF THE DISCLOSURE

This disclosure relates to crop-packing devices, such as round balers, and to an external belt guide for a round baler.

BACKGROUND OF THE DISCLOSURE

In various settings, crops or other material may be arranged for pick-up by mechanized equipment. For example, cut material (e.g., hay) in a field may be raked or otherwise arranged into windrows in the field for further processing. Various mechanisms may then be utilized to gather such material. For example, a crop-packaging device such as a baler may be pulled by a tractor along a windrow of cut material and may gather the material from the windrow. The material may then be passed into a packaging (e.g., baling) chamber for formation into a crop package (e.g., a bale). In various configurations, such a crop package may be generally cylindrical in shape and may be typically referred to as a "round" bale. Similarly, a baler that forms a round bale may be referred to as a "round" baler.

Once formed, a bale (or other crop package) may be ejected from the bale forming chamber of the baler (or other crop-packaging device). In known round balers, for example, a rear gate to the bale forming chamber may open (e.g., by pivoting backward and vertically upward), such that a formed bale may move backward (and typically fall downward) out of the bale forming chamber. In certain operations, bales (or other crop packages) may be wrapped with wrap material before (or after) being ejected from the bale forming (or other packaging) chamber. Such wrapping may be useful, for example, to provide a degree of surface protection and for structural integrity.

Generally, the packaging chamber includes one or more belts, which are movable to manipulate the cut material into the bale. When crop material is acting on the belts, the crop material provides tension, which maintains the position of the belts within the bale forming chamber. When crop material is no longer acting on the belts, however, the belts may have slack, which can lead to the belts becoming misaligned within the bale forming chamber. In these instances, a belt guide may be used to guide the position of the belt to maintain the proper alignment of the belt. Depending upon the placement of the belt guide, however, crop material may accumulate about the belt guide, which may cause friction between the belt and the belt guide. Moreover, in instances where the bale is wrapped with the wrap material before being ejected from the bale forming chamber, the friction may generate heat on the belt and/or belt guide, which may undesirably impact the wrap material.

SUMMARY OF THE DISCLOSURE

The disclosure provides an external belt guide for a baler that is coupled to the baler external to the baling chamber, which reduces an accumulation of crop material while enabling the guiding of a belt and wrap material into the baling chamber.

In one aspect, the disclosure provides a round baler. The baler includes a bale forming chamber having a belt to form a bale of crop material. The baler also includes a wrap feed system. The baler includes a belt guide coupled to the baler so as to be external to the bale forming chamber. The belt guide includes an inwardly facing surface substantially parallel to the belt. The belt guide includes a protrusion extending inwardly towards the bale forming chamber. The protrusion is positioned adjacent a side of the belt. The belt guide is configured to sandwich wrap material between the belt and the belt guide.

In another aspect, the disclosure provides a round baler. The baler includes a bale forming chamber having a belt to form a bale of crop material and the belt is supported on a roller. The baler includes a wrap feed system and a belt guide coupled to the baler so as to be external to the bale forming chamber and proximate the roller. The belt guide includes an inwardly facing surface substantially parallel to the belt and a protrusion extending inwardly towards the bale forming chamber. The protrusion is positioned adjacent a side of the belt. The belt guide is configured to sandwich wrap material between the belt and the belt guide, and the wrap material flows over the protrusion of the belt guide along the edge the belt.

In yet another aspect, the disclosure provides a round baler. The baler includes a bale forming chamber having a belt to form a bale of crop material, and the belt is supported on a roller. The baler includes a wrap feed system, and a belt guide coupled to the baler so as to be external to the bale forming chamber and proximate the roller. The belt guide includes an inwardly facing surface substantially parallel to the belt. The belt guide includes a protrusion extending inwardly towards the bale forming chamber. The protrusion is positioned adjacent a side of the belt. The belt guide is configured to sandwich wrap material between the inwardly facing surface and an external surface of the belt.

In one aspect, a belt guide for a baler having a bale forming chamber with at least one belt to form a bale of crop material is provided. The belt guide includes a guide. The guide includes a guide protrusion that extends inwardly toward the bale forming chamber proximate an edge of the at least one belt. The belt guide is coupled to the baler external to the bale forming chamber.

In yet another aspect, a baler is provided. The baler includes a bale forming chamber having at least one belt to form a bale of crop material. The baler includes a belt guide coupled to the baler so as to be external to the bale forming chamber. The belt guide includes a guide including a guide protrusion that extends inwardly toward the bale forming chamber proximate an edge of the at least one belt.

In yet another aspect, a baler is provided. The baler includes a bale forming chamber having a plurality of belts to form a bale of crop material. The plurality of belts are supported on at least one belt support member. A gap is defined between adjacent belts of the plurality of belts. The baler includes a belt guide coupled to the baler. The belt guide is coupled to the baler external to the bale forming chamber. The belt guide includes a guide including a guide protrusion that extends into one of the gaps defined between adjacent belts of the plurality of belts and inward toward the bale forming chamber. The guide is proximate edges of the respective adjacent belts of the plurality of belts. The belt guide includes a guide body having a guide surface positioned proximate the respective adjacent belts of the plurality of belts opposite the bale forming chamber. The guide surface is oblique to an exterior surface of each of the respective adjacent belts of the plurality of belts and the guide protrusion extends a distance above the guide surface. The belt guide is coupled to the baler such that an end of the guide is adjacent to the at least one belt support member.

The details of one or more embodiments are set forth in the accompanying drawings and the description below. Other features and advantages will become apparent from the description, the drawings, and the claims.

BRIEF DESCRIPTION OF THE DRAWINGS

FIG. 5A is a detail cross-sectional view taken at 5A-5A on FIG. 5, which illustrates a guide protrusion of one of the external belt guides positioned within a gap defined between adjacent belts of the round baler and contacting the wrap material;

FIG. 13 is a cross-sectional view taken along line 13-13 of FIG. 12, which illustrates the one or more external belt guides coupled along the portion of the wrap feed and cut-off system associated with the round baler and contacting the wrap material;

FIG. 13A is a detail cross-sectional view taken at 13A-13A on FIG. 13, which illustrates a guide protrusion of one of the external belt guides positioned within a gap defined between adjacent belts of the round baler and contacting the wrap material;

Like reference symbols in the various drawings indicate like elements.

DETAILED DESCRIPTION

Figure 1:
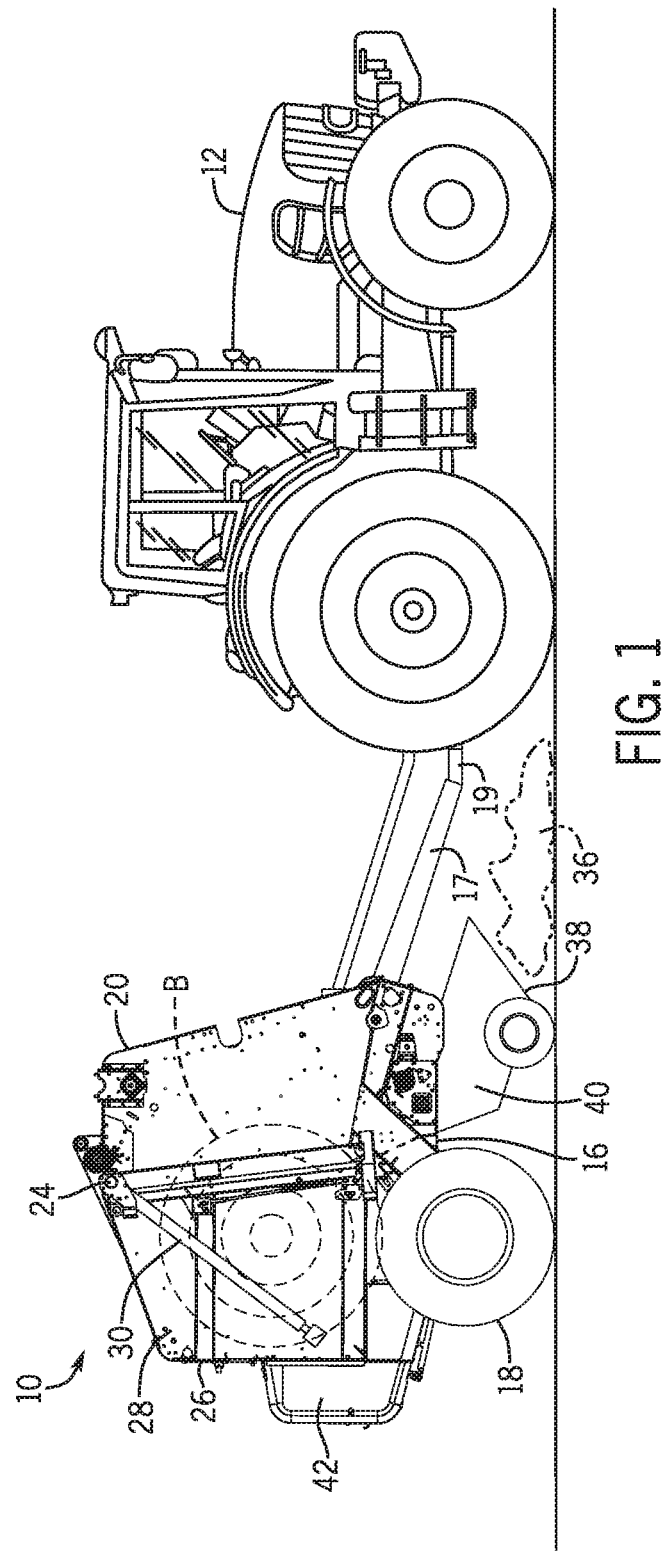
FIG. 1 is a perspective view of an example work vehicle in the form of a tractor, which includes an exemplary crop-packaging device, such as a round baler, having one or more external belt guides according to various embodiments of this disclosure.

The following describes one or more example embodiments of the disclosed system, as shown in the accompanying figures of the drawings described briefly above. Various modifications to the example embodiments may be contemplated by one of skill in the art.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

As noted above, in various situations it may be useful to gather material (e.g., cut plant material) for further processing. For example, a cutting or raking operation may leave cut material (e.g., hay) arranged in windrows in a field. Balers and other equipment may then be used to gather the material from the windrows for formation into bales.

The following describes one or more example implementations of the disclosed system for an external belt guide for a crop-packaging device, such as a round baler, as shown in the accompanying figures of the drawings described briefly above. It will be understood, however, that the disclosed external belt guide may be utilized with a variety of crop-packaging devices. For example, that the external belt guide may be used with crop harvesting machines, such as a cotton picker. Generally, the disclosed systems provide for the improved packaging of a crop material by positioning a belt guide external to the bale forming chamber. By positioning the belt guide external to the bale forming chamber, the belt guide maintains a position of a respective belt within the bale forming chamber while reducing a build-up or accumulation of crop material between the respective belt and the belt guide. The reduction in the build-up or accumulation of crop material between the respective belt and the belt guide improves the efficiency of the round baler and reduces downtime for maintenance.

Moreover, the external belt guide maintains a structural integrity of the wrap material. In this regard, accumulated crop may increase friction between the belt and an internally positioned belt guide, which may generate heat during the operation of the round baler. In these instances, the generated heat may cause a surface of the internally mounted belt guide and/or belt to have an increased temperature. Because the wrap material is in contact with the belt, this increased temperature may weaken the wrap material. Thus, by positioning the belt guide of the subject disclosure external to the bale forming chamber, the reduction in crop accumulation maintains the external belt guide at a desirable operating temperature for contacting the wrap material.

As used herein, "wrap material" may indicate one of various types of materials utilized to hold bales of compressed crop or other plant matter together or to otherwise maintain the integrity (structural or otherwise) of the bales. Wrap material may include, for example, twine or similar material, net wrap, plastic or other sheeting (i.e., "sheet wrap"), banding, straps, and so on. In certain instances, wrap material may be provided in spools or rolls, including spools of twine, rolls of net wrap, rolls of plastic sheeting, and so on.

The following description relates to the round baler that produces bales 5 feet (ft.) wide. In the example of a round baler that produces 5 ft. wide bales, 5 external belt guides may be positioned external to the bale forming chamber to guide a respective one of 5 belts. It should be noted, however, that the present disclosure is not so limited. In this regard, the round baler may produce bales of any dimension, and may include any number of external belt guides to guide a respective one of the belts of the bale forming chamber. For example, a round baler that produces a 4 ft. wide bale may include 3 external belt guides, with one external belt guide associated with respective ones of the belts of the bale forming chamber.

Figure 2:
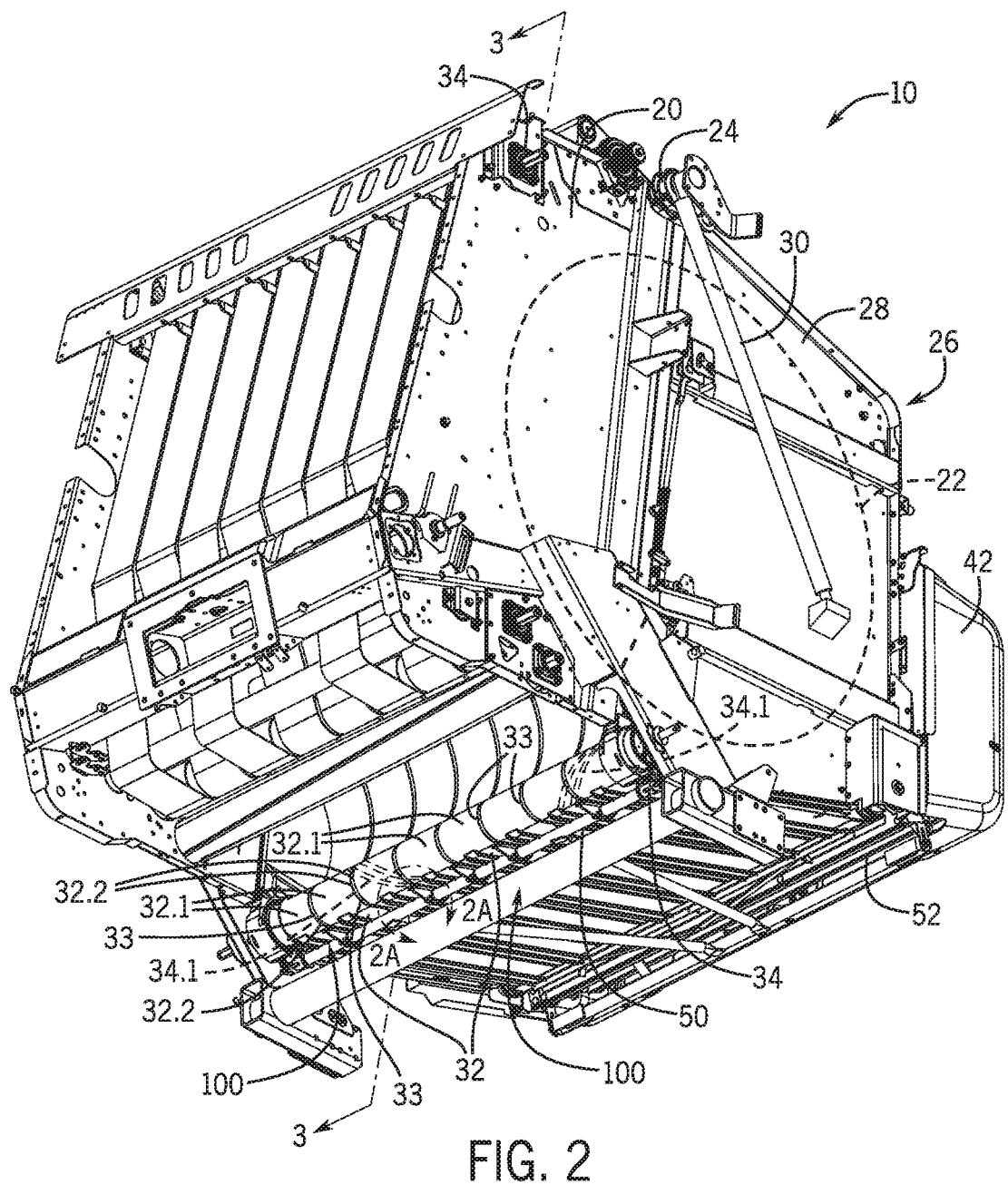
FIG. 2 is a perspective view of the round baler of FIG. 1, which includes the one or more external belt guides.

As noted above, the system described herein may be employed with respect to a variety of crop-packaging devices, such as a round baler 10. The baler 10 is configured to be towed by a tractor 12. The baler 10 may have a main frame 16 supported on a pair of ground wheels 18. A draft tongue 17 may have a rear end joined to the main frame 16 and a forward end defined by a clevis arrangement 19 adapted for being coupled to a drawbar (not shown) of the tractor 12. A pair of upright side walls 20 may be fixed to the main frame 16 to define forward regions of opposite side walls of a bale forming (or baling) chamber 22. Mounted for pivoting vertically about a horizontal pivot arrangement 24 located at an upper rear location of the side walls 20 is a discharge gate 26 including opposite upright side walls 28, which define opposite sides of a rear region of the bale forming chamber 22. One or more gate hydraulic cylinders 30 may be coupled between the main frame 16 and the opposite side walls 28 of the discharge gate 26 and are selectively operable for moving the discharge gate 26 between a lowered baling position and an opened discharge position. It is understood that while one cylinder is shown, two or more cylinders may be used to open and close the discharge gate 26. With reference to FIG. 2, the baler 10 as shown is of a variable chamber design and thus comprises a plurality of longitudinally extending side-by-side belts 32 supported on a plurality of belt support members or rollers 34. In one example, each of the belts 32 is spaced apart by a gap 33. As will be discussed, a belt guide 100 may be positioned proximate an exterior surface 32.1 of a respective one of the belts 32 such that a portion of the belt guide 100 extends into a respective one of the gaps 33 to be in proximity to and/or contact an edge 32.2 of an adjacent one of the belts 32. At least one of the rollers 34 is driven, via a chain drive coupled to a motor or other arrangement, to drive the belts 32 about the bale forming chamber 22.

Figure 2A:
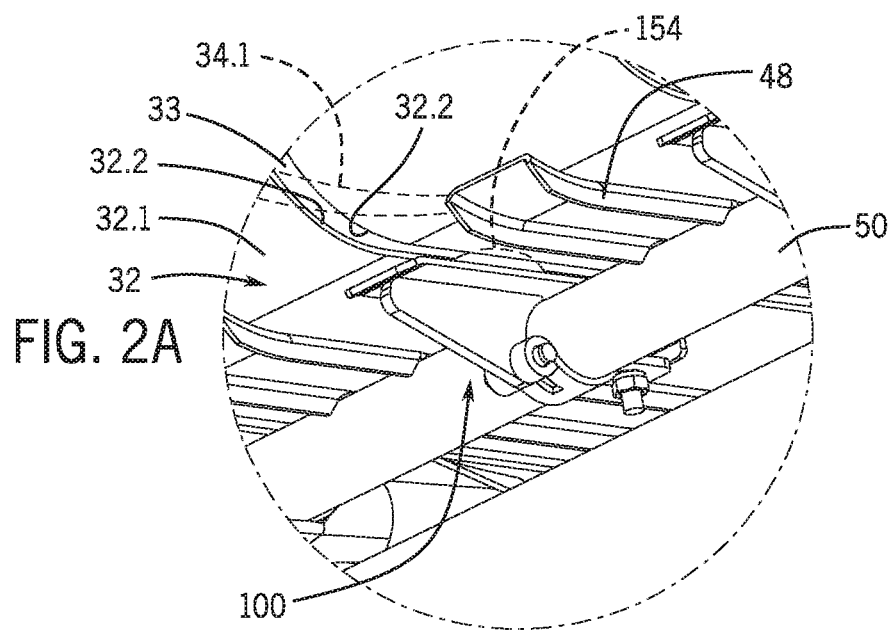
FIG. 2A is a perspective detail view taken from FIG. 2, which illustrates one of the external belt guides positioned proximate an exterior surface of at least one belt associated with the round baler.
Figure 3:
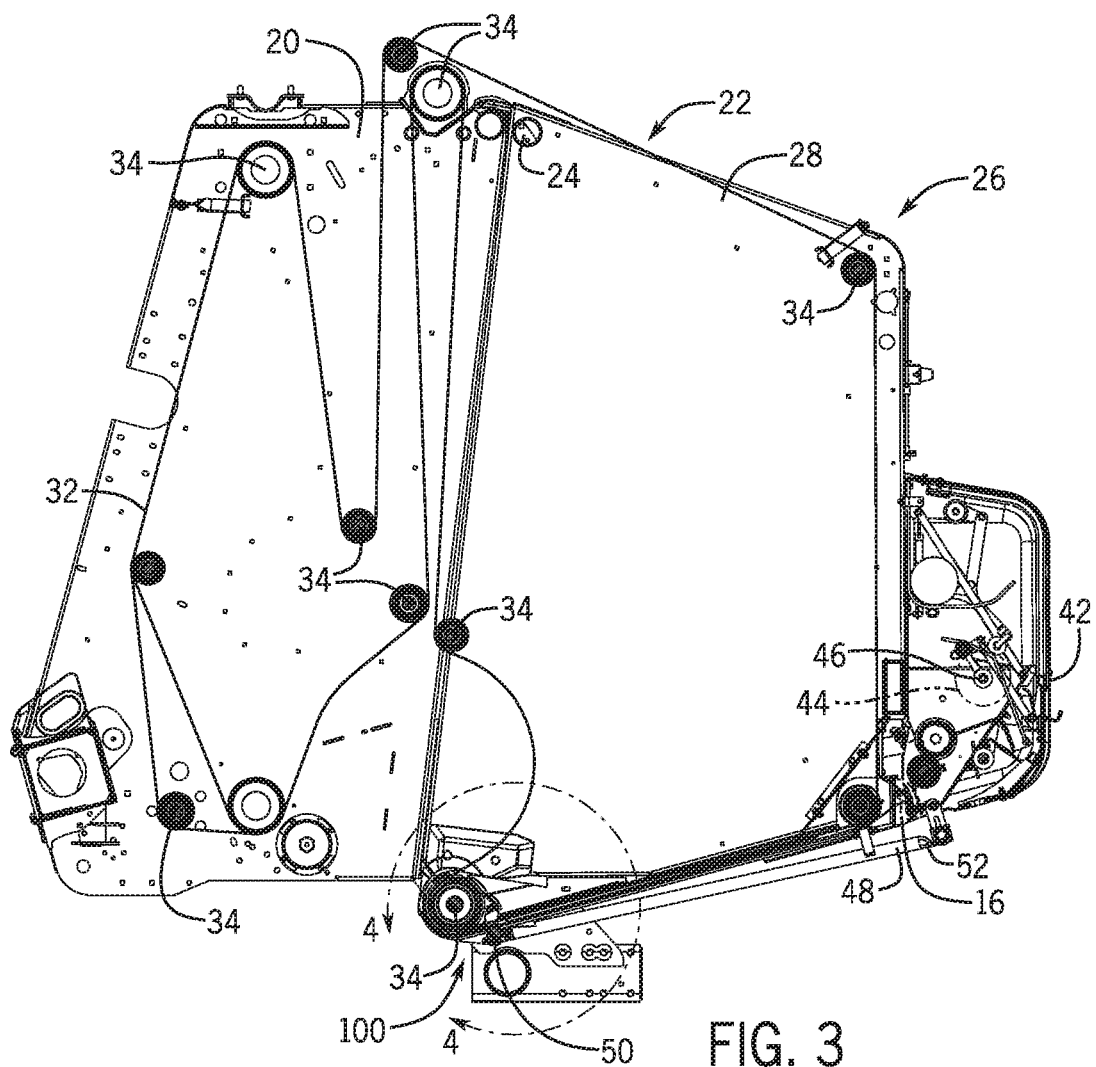
FIG. 3 is a cross-section view of the round baler of FIG. 2, taken along line 3-3 of FIG. 2.

As will be discussed, with reference to FIG. 2A, one or more belt guides 100 are coupled or mounted to the baler 10 so as to be positioned externally of the bale forming chamber 22. The belt guides 100 maintain the position of the belts 32 in operating conditions in which the belts are not under tension, such as during a discharge of a bale through the discharge gate 26. In addition, one or more of the rollers 34 may include a roller protrusion 34.1 defined about a perimeter of the respective one of the one or more rollers 34, which cooperates with the belt guides 100 to inhibit the build-up of crop material around the belt guides 100. With reference to FIG. 3, the bale forming chamber 22 is defined by the rollers 34 and belts 32, and is generally contained between the side walls 20, 28 (FIG. 1). In one example, the bale forming chamber 22 includes eight belts that cooperate to form a bale having a width of about 5 ft., however, it will be understood that the bale forming chamber 22 may form a bale of any desired size.

With reference back to FIG. 1, the baler 10 may also include one or more controllers, such as electronic controller unit (ECU). The controllers may be configured as computing devices with associated processor devices and memory architectures, as hydraulic, electrical or electro-hydraulic controllers, or otherwise. As such, the controllers may be configured to execute various computational and control functionality with respect to the baler 10 (and other machinery). The controllers may be in electronic, hydraulic, or other communication with various other systems or devices of the baler 10 (or machinery). For example, the controllers may be in electronic or hydraulic communication with various actuators, sensors, and other devices within (or outside of) the baler 10, including various devices associated with the bale forming chamber and related mechanisms. Additionally one or more electro-hydraulic control valves (not shown) may be a part of a baler hydraulic system and interposed in hydraulic lines connecting the gate hydraulic cylinders 30 with a hydraulic supply associated with the tractor 12. The electro-hydraulic control valve may be electrically activated according to signals from the ECU and may be configured to control the flow of hydraulic fluid between the hydraulic supply associated with the tractor 12 and the gate hydraulic cylinders 30.

In its general operation, with reference back to FIG. 1, the baler 10 is drawn through a field by the tractor 12 attached to the tongue 17. Crop material 36 is fed into a crop inlet 38 of the bale forming chamber 22 from a windrow of crop on the ground by an accumulator 40. In the baler 10, the crop material 36 is rolled in spiral fashion into a cylindrical bale B.

Upon completion, the bale B is wrapped with a wrap material, such as with twine, net or other appropriate wrapping material, via a wrap feed and cut-off system 42. Once the bale B is wrapped, and the bale B is discharged by actuation of gate hydraulic cylinders 30 that open discharge gate 26 permitting the completed bale B to be discharged from the baler 10 onto the ground. As mentioned previously, the baler 10 illustrated is a variable chamber design wherein crop is rolled up in a spiral fashion in a nip formed between oppositely moving adjacent loops of belts 32. The space between adjacent loops of belts 32 grows as the forming bale B grows larger. Accordingly, a belt tensioning device (not shown) may be provided to take up slack in the belts 32 as needed.

Figure 4:
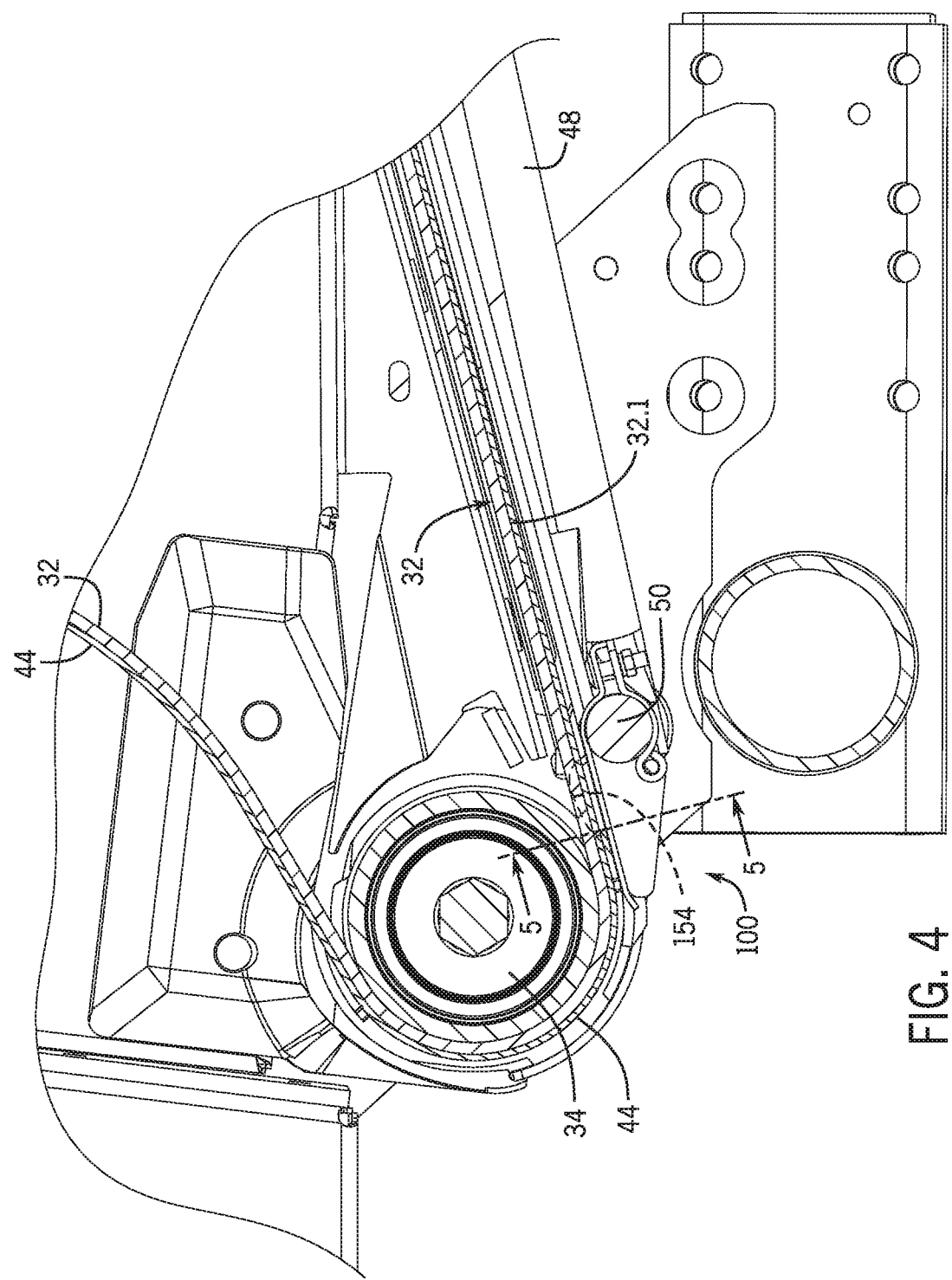
FIG. 4 is a detail cross-sectional view taken at 4-4 on FIG. 3, which illustrates one of the external belt guides contacting a wrap material.

With reference to FIG. 3, the wrap feed and cut-off system 42 is generally coupled to the baler 10 so as to be external to the bale forming chamber 22. The wrap feed and cut-off system 42 generally includes at least one spool of wrap material 44, which is supported on a roller 46. The roller 46 is driven to dispense the wrap material, which is pulled by the belts 32 into the bale forming chamber 22 and around the bale B (FIG. 1). Generally, the wrap feed and cut-off system 42 includes one or more rails 48, which assist in guiding the wrap material 44 from the wrap feed and cut-off system 42 along the belts 32 and into an interior of the bale forming chamber 22. In this example, with reference to FIG. 5, for each one of the belts 32, the wrap feed and cut-off system 42 includes a respective rail 48 to guide the wrap material 44 along the respective one of the belts 32. With reference to FIG. 6, the rails 48 are supported by a first cross-member 50 and a second cross-member 52. Each of the first cross-member 50 and the second cross-member 52 are coupled to the main frame 16. The rails 48 and the pair of cross-members 50, 52 are coupled to the main frame 16 so as to be positioned below the side wall 28, and external to the belts 32 and rollers 34 (FIG. 3). Thus, the rails 48 and the pair of cross-members 50, 52 are external to the bale forming chamber 22 (FIG. 3). In this example, the belt guides 100 are coupled to the first cross-member 50 so as to be external to the bale forming chamber 22. As shown in FIG. 4, the belt guides 100 direct the belts 32 and/or the wrap material 44 at a position external to the bale forming chamber 22, thereby reducing an accumulation of crop about the belt guides 100.

Figure 5:
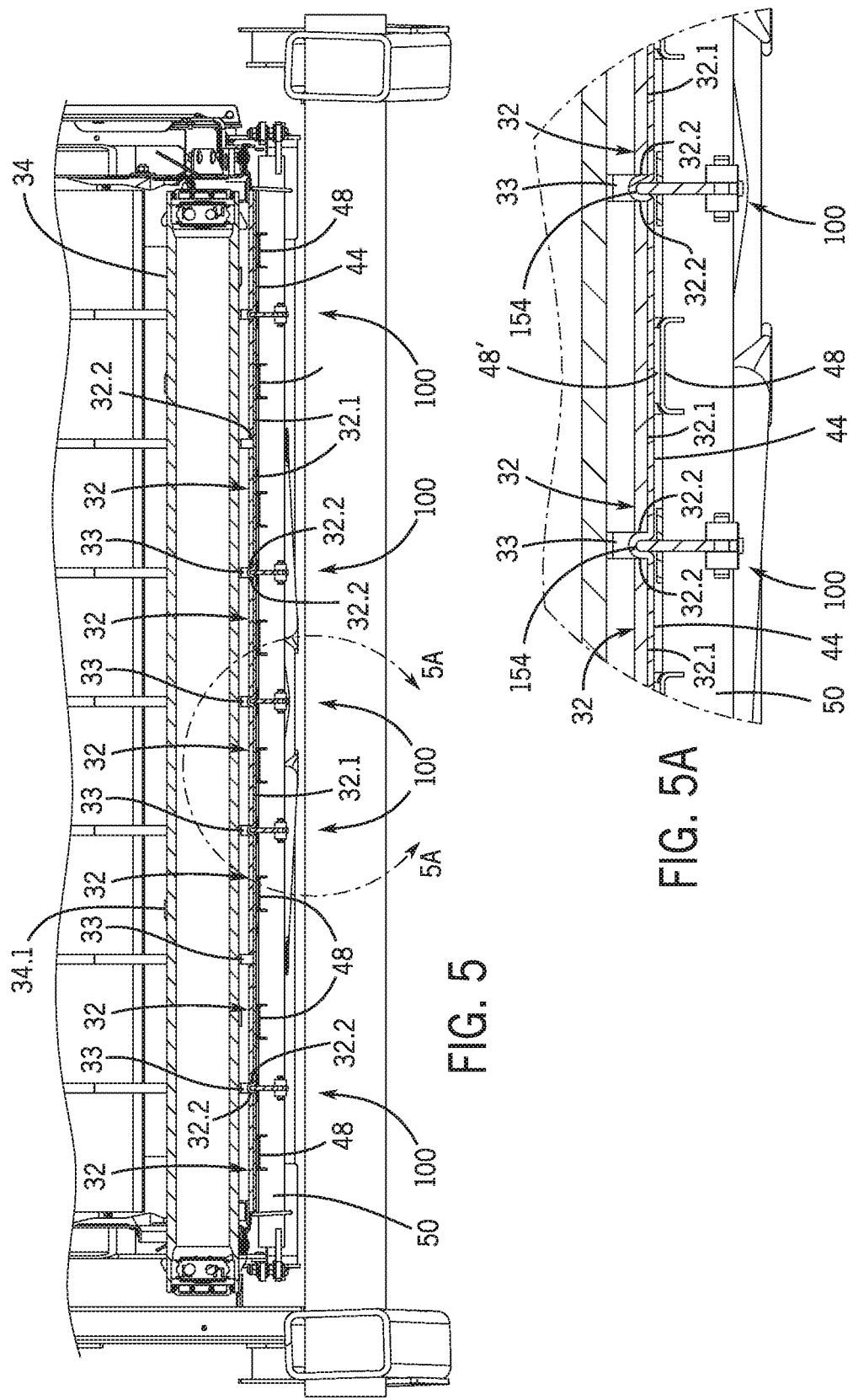
FIG. 5 is a detail cross-sectional view taken along line 5-5 of FIG. 4, which illustrates the one or more external belt guides coupled along the portion of the wrap feed and cut-off system associated with the round baler and contacting the wrap material.
Figure 6:
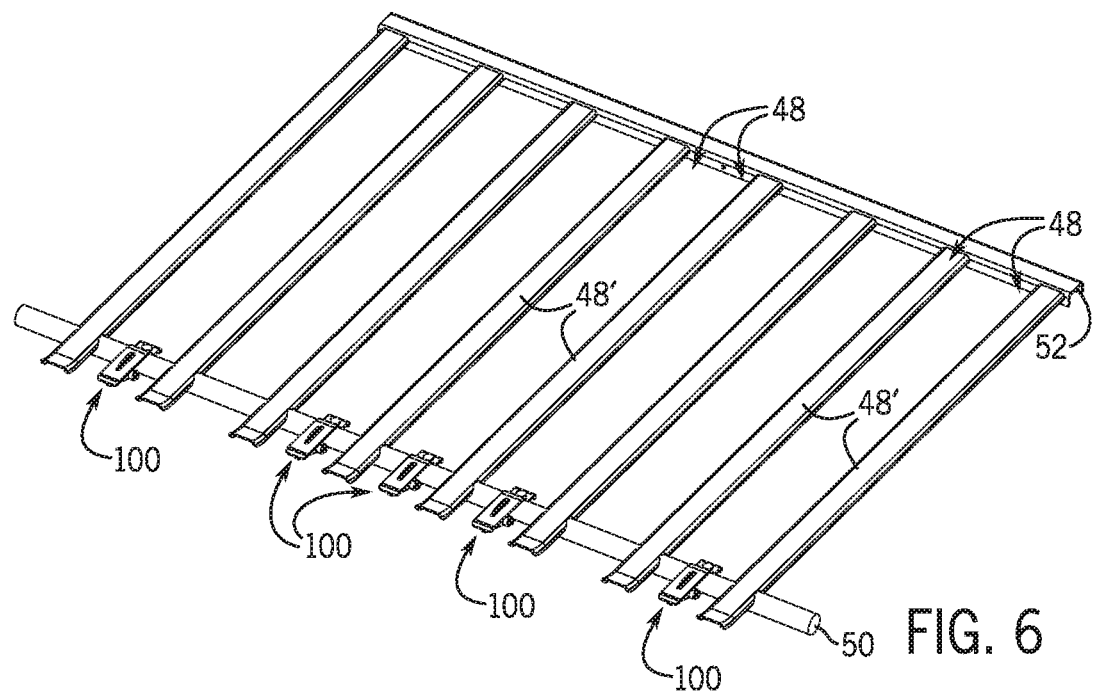
FIG. 6 is a top perspective view of the external belt guides coupled to the portion of the wrap feed and cut-off system associated with the round baler of FIG. 2.

With reference now to FIG. 5, the belt guides 100 are shown coupled to the first cross-member 50. In this example, five belt guides 100 are employed to guide the 8 belts 32 (FIG. 2) of the baler 10. It will be understood, however, that any number of belt guides 100 may be used, for example, one of the belt guides 100 may be associated with each one of the belts 32. As shown in FIG. 5, the belt guides 100 are spaced apart along the first cross-member 50. In this example, a majority of the belt guides 100 are positioned so as to be in contact with belts 32 near a mid-section of the bale forming chamber 22, and a reminder of the belt guides 100 are positioned so as to be in contact with belts 32 near the ends of the bale forming chamber 22 (FIG. 2). By placing the majority of the belt guides 100 near the mid-section, the belt guides 100 ensure the belts 32 in the mid-section do not become twisted or tangled when un-tensioned, such as when the discharge gate 26 is in the open discharge position. As will be discussed, with reference to FIG. 5, at least a portion of each of the belt guides 100 extends a distance above surfaces 48' of the rails 48 to assist in directing the belts 32 and/or wrap material 44 (FIG. 3) into the bale forming chamber 22. Further, a portion of each of the belt guides 100 extends in the gaps 33 beside the edges 32.2 of adjacent ones of the belts 32 to assist in directing the belts 32 and/or wrap material 44 (FIG. 3) into the bale forming chamber 22.

Figure 7:
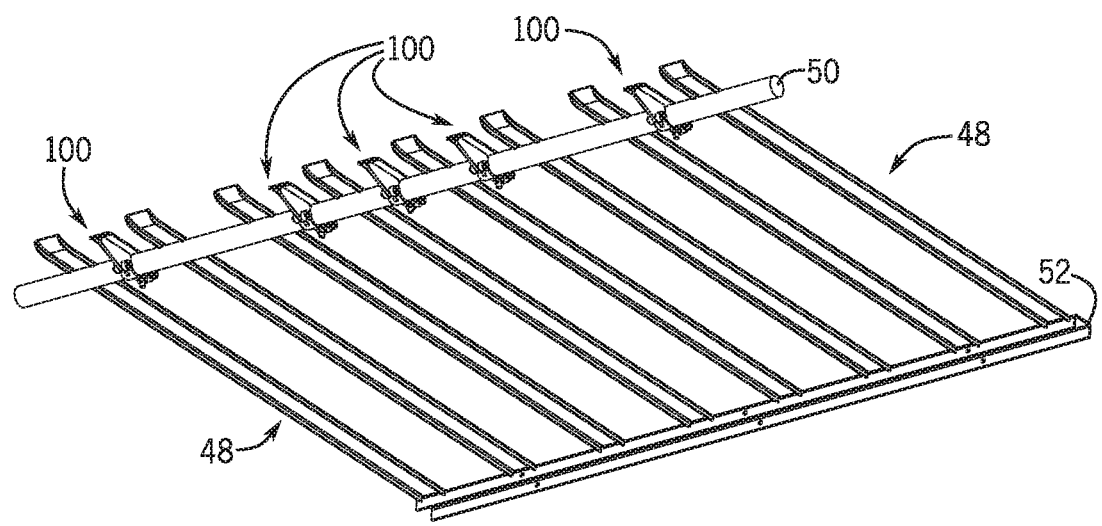
FIG. 7 is a bottom perspective view of the external belt guides coupled to the portion of the wrap feed and cut-off system associated with the round baler of FIG. 2.

With reference to FIGS. 6 and 7, in this example, each of the belt guides 100 is clamped onto the first cross-member 50. Generally, the belt guide 100 is clamped onto the first cross-member 50 so as to be adjustable in three degrees of freedom. In this example, each of the belt guides 100 is adjustable forward/back, up/down and left/right. By providing each of the belt guides 100 to be independently adjustable in three degrees of freedom, the belt guides 100 may be positioned as needed to account for characteristics associated with each of the respective belts 32. For example, one or more of the belts 32 may have a different tension than another one of the belts 32.

Figure 8:
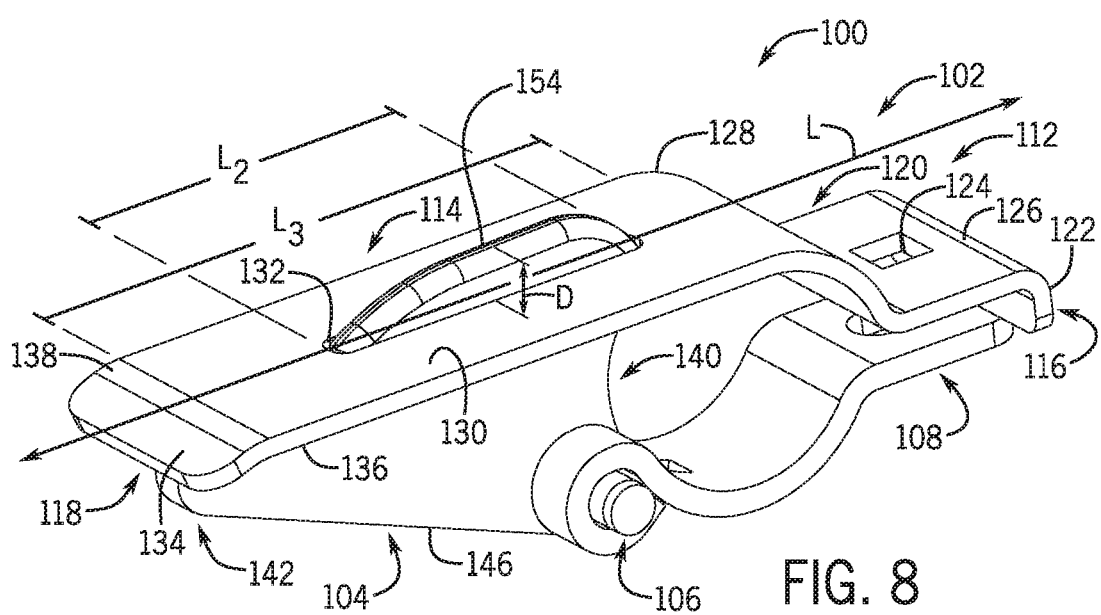
FIG. 8 is a perspective view of one of the external belt guides of FIG. 2.
Figure 9:
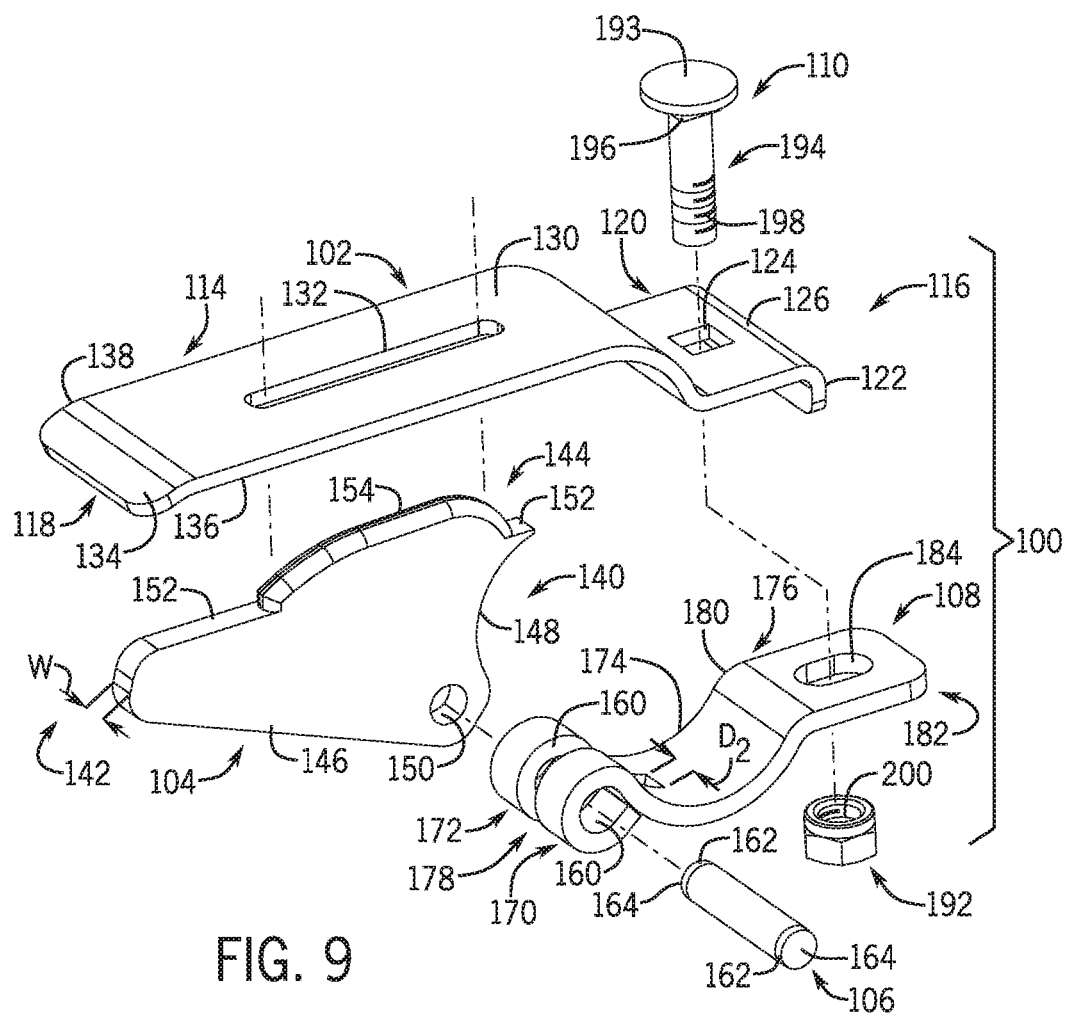
FIG. 9 is an exploded view of the external belt guide of FIG. 8.

With reference to FIG. 8, one of the belt guides 100 is shown in greater detail. As each of the belt guides 100 are the same, only one will be discussed in detail herein with the understanding that the remainder of the belt guides 100 associated with the baler 10 are the same. The belt guide 100 includes a guide body 102, a guide 104, a roll pin 106, a hinge 108 and a fastening assembly 110 (FIG. 9).

The guide body 102 is formed of a metal or metal alloy, and is stamped, machined, cast, forged, etc. In one example, the guide body 102 is composed of a steel, such as A13C steel, however, other metal or metal alloys may be employed. The guide body 102 includes a coupling section 112 and a guide section 114. Generally, the coupling section 112 is defined at a first end 116, and the guide section 114 is defined from a second end 118 to extend toward the first end 116. When the belt guide 100 is coupled to the first cross-member 50, the second end 118 of the guide section 114 is adjacent to or in close proximity to the roller 34, which inhibits the accumulation of crop material between the belt guide 100 and the roller 34 (FIG. 4).

The coupling section 112 cooperates with the hinge 108 to couple the belt guide 100 to the first cross-member 50 (FIG. 7). In this example, the coupling section 112 includes a base 120 and a flange 122. The base 120 is substantially planar, and defines an aperture 124 therethrough that receives a portion of the fastening assembly 110 (FIG. 9). In this example, the aperture 124 is substantially rectangular, however, the aperture 124 may have any desired shape that cooperates with the fastening assembly 110 to couple the belt guide 100 to the first cross-member 50 (FIG. 7).

The flange 122 extends from the base 120, and in one example, extends from the base 120 so as to be substantially perpendicular to the base 120. The flange 122 extends from the base 120 at a radius 126, which provides a smooth contact surface for the respective belt and/or wrap material. The flange 122 assists in retaining the belt guide 100 on the first cross-member 50 by contacting the hinge 108 when the belt guide 100 is coupled to the first cross-member 50 to clamp the belt guide 100 to the first cross-member 50 (FIG. 7).

A second radius 128 transitions the base 120 to the guide section 114. The second radius 128 is a first point of contact for the respective belt 32 and/or the wrap material 44 (FIG. 4). The guide section 114 extends from the second radius 128 to the second end 118 of the guide body 102. The guide section 114 generally extends along a longitudinal axis L defined by the belt guide 100. The guide section 114 includes a guide surface 130, a slot 132, a lip 134 and a coupling surface 136. The guide surface 130 is substantially planar and smooth, and extends from the second radius 128 to a third radius 138 that transitions to the lip 134. The guide surface 130 comprises a substantial majority of a surface of the guide section 114, and is a contact surface for the respective belt 32 and/or the wrap material 44. When the belt guide 100 is coupled to the first cross-member 50, the guide surface 130 is positioned proximate the respective belt 32 opposite the bale forming chamber 22 (FIGS. 2 and 3). The slot 132 is defined through the guide surface 130 between the second radius 128 and the third radius 138. The slot 132 receives a portion of the guide 104. The slot 132 generally extends for a length L2, which is substantially less than a length L3 of the guide surface 130. It should be noted, however, that the length L2 of the slot 132 may extend for the length L3, if desired.

The lip 134 extends from the third radius 138 to the second end 118. The lip 134 extends along an axis that is substantially traverse or oblique to the longitudinal axis L. The lip 134 is a last point of contact for the respective belt 32 and/or the wrap material 44 (FIG. 4). The coupling surface 136 is substantially opposite the guide surface 130. In one example, a portion of the coupling surface 136 is welded to the guide 104 to fixedly couple the guide 104 to the guide body 102.

With reference to FIG. 8, the guide 104 includes a first end 140, a second end 142, a first surface 144 and a second surface 146. The guide 104 is formed of a metal or metal alloy, and is stamped, machined, cast, forged, etc. In one example, the guide 104 is composed of a steel, such as a heat treated 1045 steel, however, other metal or metal alloys may be employed. The first end 140 includes an arcuate portion 148 and defines a bore 150. The arcuate portion 148 is substantially concave, and is configured to mate with the cylindrical shape of the first cross-member 50 (FIG. 6). The bore 150 is defined through the guide 104 at the first end 140 so as to be adjacent to or near the second surface 146. The bore 150 is sized to receive the roll pin 106 therethrough to couple the roll pin 106 to the guide 104.

The second end 142 is rounded and is substantially opposite the first end 140. The first surface 144 is defined between the first end 140 and the second end 142. The first surface 144 includes a coupling section 152 and a guide protrusion 154. The coupling section 152 is welded to the coupling surface 136 of the guide body 102 to fixedly couple the guide 104 to the guide body 102. In one example, the coupling surface 136 and the coupling section 152 are welded together through a suitable welding process, such as stick welding, MIG welding, flux wire welding, TIG welding, resistance spot welding, etc. The guide protrusion 154 extends upwardly from the first surface 144 and is disposed between opposing ends of the coupling section 152 such that the guide 104 is coupled to the guide body 102 on opposite sides of the guide protrusion 154. The guide protrusion 154 is arcuate in shape, and has a curved surface. The guide protrusion 154 is machined to have no sharp edges. Generally, the guide protrusion 154 is also polished so that in the instance the respective belt 32 and/or the wrap material 44 passes over the guide protrusion 154, the respective belt 32 and/or the wrap material 44 is not damaged by the guide protrusion 154. With reference to FIG. 7, the guide protrusion 154 is received within and through the slot 132 when the guide 104 is coupled to the guide body 102. The guide protrusion 154 generally extends for a distance D beyond the guide surface 130 of the guide body 102 to contact the edges 32.2 of the respective belt 32 and/or the wrap material 44 to direct the respective belt 32 and/or the wrap material 44. Generally, when the belt guide 100 is coupled to the first cross-member 50, the guide protrusion 154 is positioned between adjacent edges 32.2 of the respective adjacent belts 32. In addition, when the belt guide 100 is coupled to the first cross-member 50, the guide protrusion 154 extends inwardly toward the bale forming chamber 22 proximate the edge 32.2 of the respective belt 32. The guide protrusion 154 cooperates with the guide surface 130 to guide the respective one of the belts 32 and/or the wrap material 44 into the bale forming chamber 22, while preventing or inhibiting the accumulation of crop material between the respective one of the belts 32 and the belt guide 100.

In one example, with reference to FIG. 5A, the guide protrusion 154 extends the distance beyond the surface 48' of the rail 48. The belt guide 100 is coupled to the first cross-member 50 so that the belt guide 100 is positioned adjacent to the exterior surface 32.1 of the respective belt 32, and the guide protrusion 154 extends beyond the exterior surface 32.1 of the respective belt 32 into the gap 33 defined between adjacent ones of the belts 32. Thus, in this example, the guide protrusion 154 extends inwardly into the gap 33 so as to be positioned beside respective edges 32.2 of the adjacent ones of the belts 32. The belt guide 100 is coupled to the first cross-member 50 so as to be proximate to the exterior surface 32.1 of the respective belt 32, and so that the guide protrusion 154 extends into the gap 33 between the adjacent ones of the belts 32. This further assists in directing the respective belt 32 and/or the wrap material 44 into the bale forming chamber 22. It should be noted that in instances in which the wrap feed and cut-off system 42 is supplying the wrap material 44 into the bale forming chamber 22, the wrap material 44 extends over the guide surfaces 130 of the respective belt guides 100, and extends over the guide protrusion 154 of the respective belt guides 100 within the gap 33 (FIG. 5A). In addition, it should be noted that in instances in which the wrap feed and cut-off system 42 is not supplying the wrap material 44 into the bale forming chamber 22, the guide surfaces 130 of the respective belt guides 100 (FIG. 8) contact the exterior surface 32.1 of the respective belts 32 and the guide protrusion 154 extends within the gap 33 so as to be positioned adjacent to the edges 32.2 of the respective belts 32 (FIG. 2A).

With reference back to FIG. 9, the second surface 146 is substantially opposite the first surface 144. The second surface 146 tapers from the first end 140 to the second end 142. Stated another way, the second surface 146 extends along an axis that is substantially transverse or oblique to the longitudinal axis L of the belt guide 100 (FIG. 7). In other words, the second surface 146 is substantially perpendicular to a plane that includes the guide surface 130. The tapered shape of the second surface 146 provides a reduced profile for the belt guide 100 when viewed from a rear or bottom surface of the first cross-member 50 (FIG. 6).

The roll pin 106 is received through the bore 150 defined in the guide 104, and through bores 160 defined through the hinge 108 to couple the hinge 108 to the guide 104. Generally, the roll pin 106 is press-fit into the bore 150 to couple the roll pin 106 to the guide 104. The roll pin 106 is formed of a metal or metal alloy, and is stamped, machined, cast, forged, etc. In one example, the roll pin 106 is formed of steel. The roll pin 106 may include a reduced diameter 162 at opposing ends 164 to aid in press-fitting the roll pin 106 into the bore 150. The roll pin 106 movably or pivotally couples the hinge 108 to the guide 104.

The hinge 108 includes a first knuckle 170, a second knuckle 172, an arcuate section 174 and a mounting portion or section 176. The hinge 108 is formed of a metal or metal alloy, and is stamped, machined, cast, forged, etc. In one example, the hinge 108 is composed of a steel, such as A13C steel, however, other metal or metal alloys may be employed. The first knuckle 170 is spaced apart from the second knuckle 172 at a first end 178 of the hinge 108. The first knuckle 170 and the second knuckle 172 each define the through bore 160, which receives the roll pin 106. Generally, the first knuckle 170 is spaced apart from the second knuckle 172 by a distance D2, which is at least equal to or greater than a width W of the guide 104 such that the guide 104 may be received between the first knuckle 170 and the second knuckle 172.

The arcuate section 174 is defined adjacent to the first knuckle 170 and the second knuckle 172, and extends from the first knuckle 170 and the second knuckle 172 to the mounting section 176. The arcuate section 174 is substantially concave and has a radius configured to mate with the cylindrical first cross-member 50 (FIG. 6). The arcuate section 174 transitions to the mounting section 176 at a fourth radius 180.

The mounting section 176 extends from the fourth radius 180 to a second end 182 of the hinge 108. The mounting section 176 is substantially planar, and defines a bore 184. The bore 184 is sized and shaped to cooperate with a portion of the fastening assembly 110. In this example, the bore 184 is oval, however, the bore 184 may have any desired shape. The bore 184 is defined through the mounting section 176 between the fourth radius 180 and the second end 182.

The fastening assembly 110 couples the belt guide 100 to the first cross-member 50 (FIG. 7). In this example, the fastening assembly 110 includes a bolt 190 and a nut 192. It will be understood, however, that various other fastening devices may be employed to removably couple the belt guide 100 to the first cross-member 50, such as cotter pins, etc. The bolt 190 includes a head 193 and a shank 194. A rectangular key 196 may be defined adjacent to the head 193 to assist in positioning the bolt 190 through the aperture 124. In this regard, the key 196 may be shaped and configured to mate with the aperture 124 to aid in seating the bolt 190 with the aperture 124. The shank 194 is at least partially threaded, and includes a plurality of threads 198. The plurality of threads 198 mate with a corresponding plurality of threads 200 defined within the nut 192 to couple the belt guide 100 to the first cross-member 50.

With each of the guide body 102, the guide 104, the roll pin 106 and the hinge 108 formed, the belt guide 100 is assembled. In one example, the guide 104 is received through the slot 132. With the guide 104 received in the slot 132, the coupling surface 136 is fixedly coupled to the coupling section 152, via welding, for example. The hinge 108 is positioned about the guide 104, such that the bores 160 are coaxially aligned with the bore 150. The roll pin 106 is inserted through one of the bores 160 and press-fit to the guide 104, such that each of the first knuckle 170 and the second knuckle 172 are supported for rotation relative to the guide 104 by the roll pin 106. Thus, the hinge 108 is coupled to the guide 104 at the first end 178.

With the belt guide 100 assembled, with reference to FIG. 7, the belt guide 100 is coupled to the first cross-member 50 of the pre-assembled baler 10 such that the first cross-member 50 is received between the arcuate portion 148 of the guide 104, the arcuate section 174 of the hinge 108 and a portion of the coupling surface 136 adjacent to and at the second radius 128. Stated another way, the portion of the coupling surface 136 uncoupled from the guide 104 near and at the second radius 128 cooperates with the arcuate portion 148 and the arcuate section 174 to define a substantially circular opening that receives the first cross-member 50. In other words, the hinge 108 has the second end 182 that cooperates with the guide 104 and the guide body 102 to receive a portion of the baler 10 or the first cross-member 50 to couple the belt guide 100 to the baler 10 such that the belt guide 100 is positioned external to the bale forming chamber 22 (FIG. 2).

With the belt guide 100 positioned about the first cross-member 50, the belt guide 100 may be adjusted forward/rearward, left/right and up/down as needed to ensure the belt guide 100 contacts the respective belt 32 when the belts 32 are not tensioned. With the belt guide 100 in the desired position, the bolt 190 is inserted into the aperture 124 and through the bore 184. The nut 192 threadably engages with the bolt 190 to couple the belt guide 100 to the first cross-member 50. The bolt 190 and/or nut 192 may be tightened until a desired or predetermined clamp force is reached. This process may be repeated any number of times until the desired or predetermined number of belt guides 100 are coupled to the first cross-member 50.

With the predetermined number of belt guides 100 coupled to the first cross-member 50, the guide protrusion 154 and the guide surface 130 of the belt guides 100 may contact respective one of the belts 32 in instances where the respective belts 32 are not under tension. The contact between the guide protrusion 154 and the guide surface 130 maintains the respective belts 32 in the desired orientation and position for resuming operation for forming a bale. The position of the belt guides 100 as external to the bale forming chamber 22 ensures that crop material does not accumulate between the belts 32 and/or the belt guides 100, and maintains the belt guides 100 at an optimum working temperature (through the reduction of friction that may be caused by accumulated crop material). This further ensures that when the wrap material 44 is fed from the wrap feed and cut-off system 42, the wrap material 44 is not damaged by the belt guides 100. Moreover, the guide protrusion 154 and the guide surface 130 cooperate to direct the wrap material 44 along the belts 32 and into the bale forming chamber 22 to secure a formed bale B (FIG. 1).

Thus, in one example, a belt guide for a baler having a bale forming chamber with at least one belt to form a bale of crop material is provided. The belt guide includes a guide body having a guide surface positioned proximate the at least one belt opposite the bale forming chamber, and a guide coupled to the guide body and including a guide protrusion that extends inwardly toward the bale forming chamber proximate an edge of the at least one belt. The belt guide is coupled to the baler external to the bale forming chamber.

In another example, a baler is provided. The baler includes a bale forming chamber having at least one belt to form a bale of crop material. The baler includes a belt guide coupled to the baler so as to be external to the bale forming chamber. The belt guide includes a guide body having a guide surface positioned proximate the at least one belt opposite the bale forming chamber. The belt guide includes a guide coupled to the guide body and including a guide protrusion that extends inwardly toward the bale forming chamber proximate an edge of the at least one belt.

In one example, a baler is provided. The baler includes a bale forming chamber having at least one belt to form a bale of crop material. The at least one belt is supported on at least one belt support member. The baler includes a belt guide coupled to the baler. The belt guide is coupled to the baler external to the bale forming chamber. The belt guide includes a guide body having a guide surface positioned proximate the at least one belt opposite the bale forming chamber. The belt guide includes a guide coupled to the guide body and including a guide protrusion that extends inwardly toward the bale forming chamber proximate an edge of the at least one belt. The belt guide is coupled to the baler such that an end of the guide body is adjacent to the at least one belt support member.

It should be noted that in other embodiments, the one or more belt guides 100 may be configured differently to direct and guide a belt associated with a crop packaging device, such as the baler 10. For example, with reference to FIG. 10, one or more belt guides 300 are shown for use with the baler 10. As the one or more belt guides 300 include components that are substantially similar to or the same as the belt guide 100 discussed with regard to FIGS. 1-9, the same reference numerals will be used to denote the same or similar features.

Figure 10:
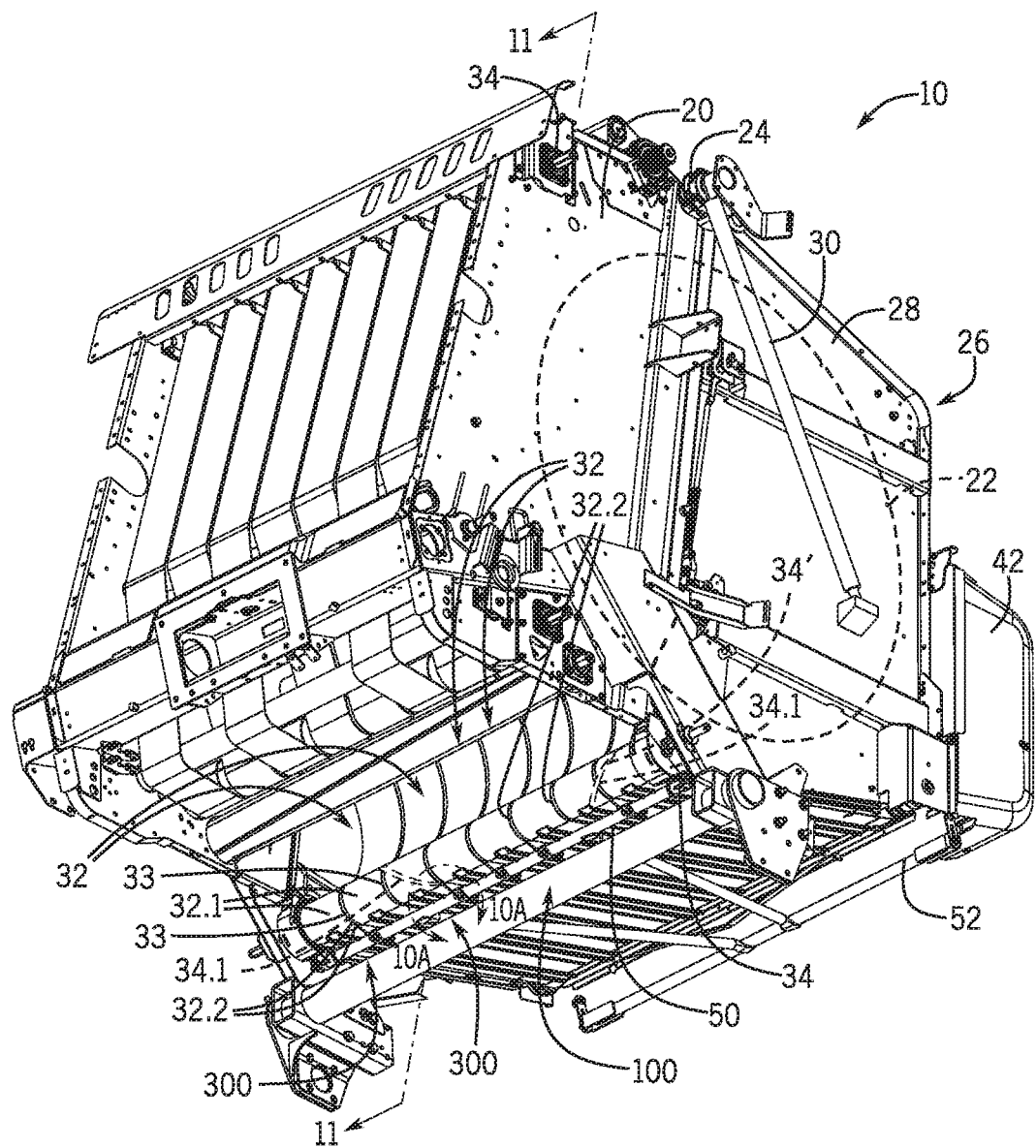
FIG. 10 is a perspective view of the round baler of FIG. 1, which includes one or more external belt guides according to various embodiments of this disclosure.

With reference to FIG. 10, the baler 10 has the plurality of longitudinally extending side-by-side belts 32 supported on the plurality of belt support members or rollers 34. As discussed, each of the belts 32 is spaced apart by the gap 33. The one or more belt guides 300 may be positioned proximate the exterior surface 32.1 of a respective one of the belts 32 such that a portion of the belt guide 300 extends into a respective one of the gaps 33 to be in proximity to and/or contact the edge 32.2 of an adjacent one of the belts 32. At least one of the rollers 34 is driven, via a chain drive coupled to a motor or other arrangement, to drive the belts 32 about the bale forming chamber 22.

Figure 10A:
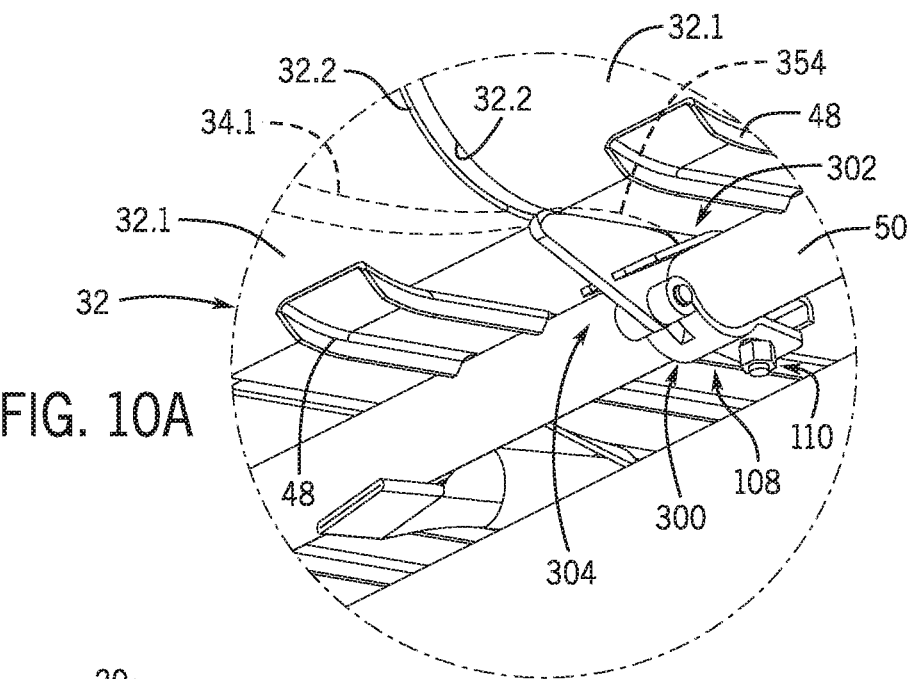
FIG. 10A is a perspective detail view taken from FIG. 10, which illustrates one of the external belt guides positioned proximate an exterior surface of at least one belt associated with the round baler.
Figure 11:
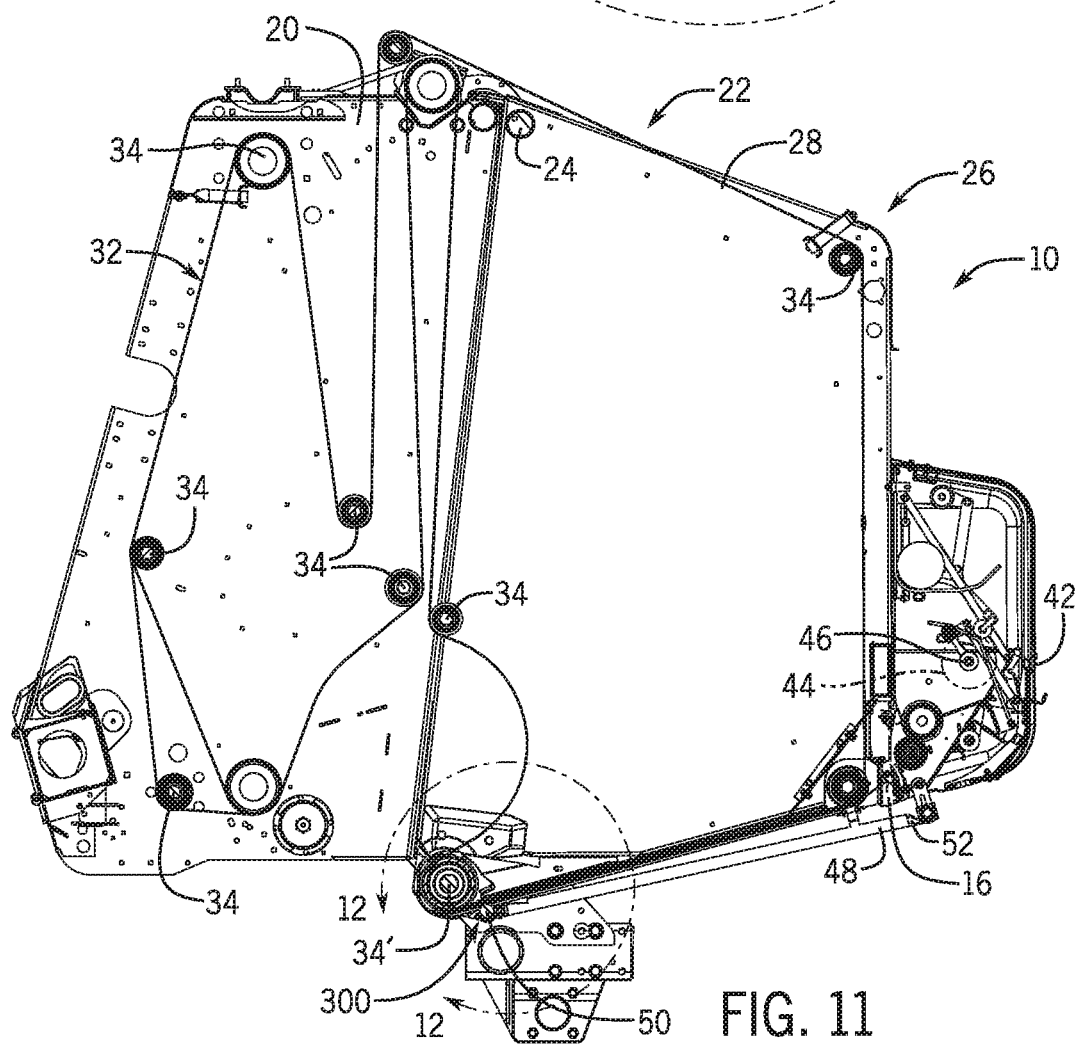
FIG. 11 is a cross-section view of the round baler of FIG. 10, taken along line 11-11 of FIG. 10.

With reference to FIG. 10A, the one or more belt guides 300 are coupled or mounted to the baler 10 so as to be positioned externally of the bale forming chamber 22. The belt guides 300 maintain the position of the belts 32 in operating conditions in which the belts 32 are not under tension, such as during a discharge of a bale through the discharge gate 26. In addition, one or more of the rollers 34 may include a roller protrusion 34.1 defined about a perimeter of the respective one of the one or more rollers 34, which cooperates with the belt guides 300 to prohibit the build-up of crop material around the belt guides 300. With reference to FIG. 11, the bale forming chamber 22 is defined by the rollers 34 and belts 32, and is generally contained between the side walls 20, 28 (FIG. 1). In one example, the bale forming chamber 22 includes eight belts that cooperate to form a bale having a width of about 5 ft., however, it will be understood that the bale forming chamber 22 may form a bale of any desired size.

Figure 12:
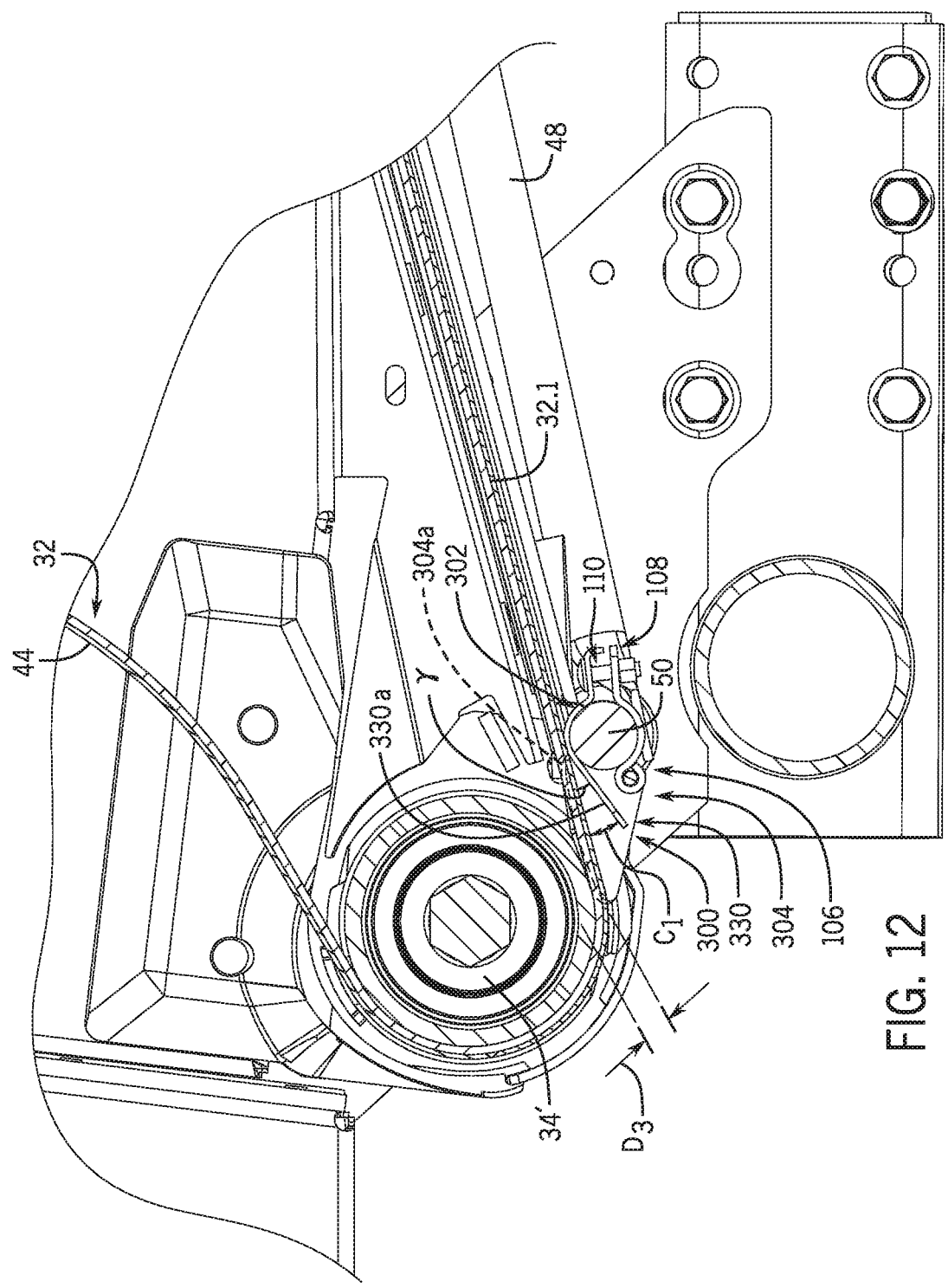
FIG. 12 is a detail cross-sectional view taken at 12-12 on FIG. 11, which illustrates one of the external belt guides contacting a wrap material.

As discussed, the wrap feed and cut-off system 42 is generally coupled to the baler 10 so as to be external to the bale forming chamber 22. The wrap feed and cut-off system 42 generally includes the at least one spool of wrap material 44, which is supported on the roller 46. The roller 46 is driven to dispense the wrap material, which is pulled by the belts 32 into the bale forming chamber 22 and around the bale B (FIG. 1). With reference to FIG. 13, for each one of the belts 32, the wrap feed and cut-off system 42 includes a respective one of the rails 48 to guide the wrap material 44 along the respective one of the belts 32. The rails 48 are supported by the first cross-member 50 and the second cross-member 52. The rails 48 and the pair of cross-members 50, 52 are coupled to the main frame 16 so as to be positioned below the side wall 28, and external to the belts 32 and rollers 34 (FIG. 10). Thus, the rails 48 and the pair of cross-members 50, 52 are external to the bale forming chamber 22. In this example, the belt guides 300 are coupled to the first cross-member 50 so as to be external to the bale forming chamber 22. As shown in FIG. 12, the belt guides 300 direct the belts 32 and/or the wrap material 44 at a position external to the bale forming chamber 22, thereby reducing an accumulation of crop about the belt guides 300. In one example, each of the belt guides 300 are positioned external to the bale forming chamber 22 such that an end of the respective belt guide 300 is a distance D3 from one of the belt supporting members or rollers 34, and in this example, each of the belt guides 300 is spaced the distance D3 from the roller 34'. The distance D3 is about 1.0 millimeters (mm) to about 3.0 millimeters (mm). Generally, the distance D3 is predetermined to minimize an accumulation of crop between the roller 34' and the belts 32. In addition, the distance D3 ensures that the belts 32 may not ride over the belt guides 300 when the belts 32 are worn thin.

With reference now to FIG. 13, the belt guides 300 are shown coupled to the first cross-member 50. In this example, five belt guides 300 are employed to guide the 8 belts 32 (FIG. 10) of the baler 10. It will be understood, however, that any number of belt guides 300 may be used, for example, one of the belt guides 300 may be associated with each one of the belts 32. As shown in FIG. 13, the belt guides 300 are spaced apart along the first cross-member 50. In this example, a majority of the belt guides 300 are positioned so as to be in contact with belts 32 near a mid-section of the bale forming chamber 22, and a reminder of the belt guides 300 are positioned so as to be in contact with belts 32 near the ends of the bale forming chamber 22 (FIG. 2). By placing the majority of the belt guides 300 near the mid-section, the belt guides 300 ensure the belts 32 in the mid-section do not become twisted or tangled when untensioned, such as when the discharge gate 26 is in the open discharge position. As will be discussed, with reference to FIG. 13A, at least a portion of each of the belt guides 300 extends a distance above surfaces 48' of the rails 48 to assist in directing the belts 32 and/or wrap material 44 (FIG. 12) into the bale forming chamber 22. Further, a portion of each of the belt guides 300 extends in the gaps 33 beside the edges 32.2 of adjacent ones of the belts 32 to assist in directing the belts 32 and/or wrap material 44 (FIG. 12) into the bale forming chamber 22.

Figure 14:
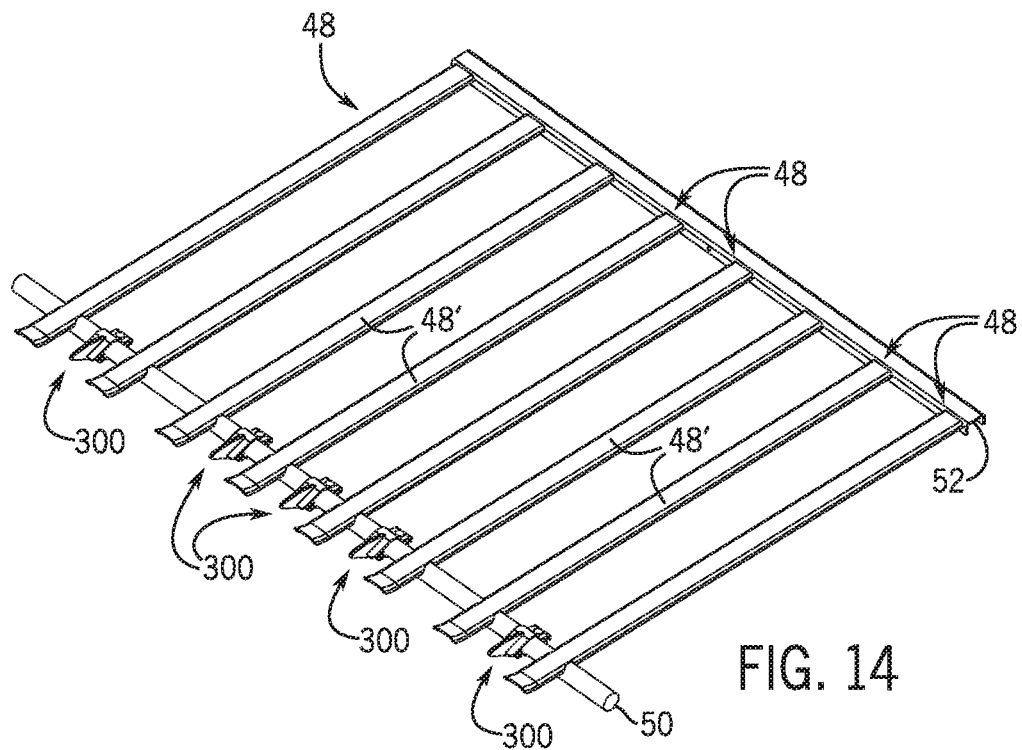
FIG. 14 is a top perspective view of the external belt guides coupled to the portion of the wrap feed and cut-off system associated with the round baler of FIG. 10.
Figure 15:
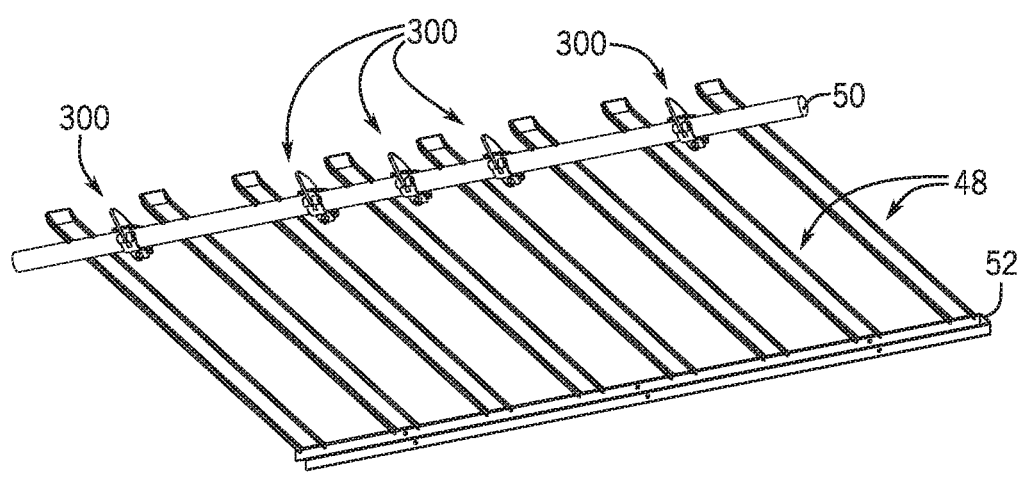
FIG. 15 is a bottom perspective view of the external belt guides coupled to the portion of the wrap feed and cut-off system associated with the round baler of FIG. 10.

With reference to FIGS. 14 and 15, in this example, each of the belt guides 300 is clamped onto the first cross-member 50. Generally, the each of the belt guides 300 is clamped onto the first cross-member 50 so as to be adjustable in three degrees of freedom. In this example, each of the belt guides 300 is adjustable forward/back, up/down and left/right. By providing each of the belt guides 300 to be independently adjustable in three degrees of freedom, the belt guides 300 may be positioned as needed to account for characteristics associated with each of the respective belts 32. For example, one or more of the belts 32 may have a different tension than another one of the belts 32.

Figure 16:
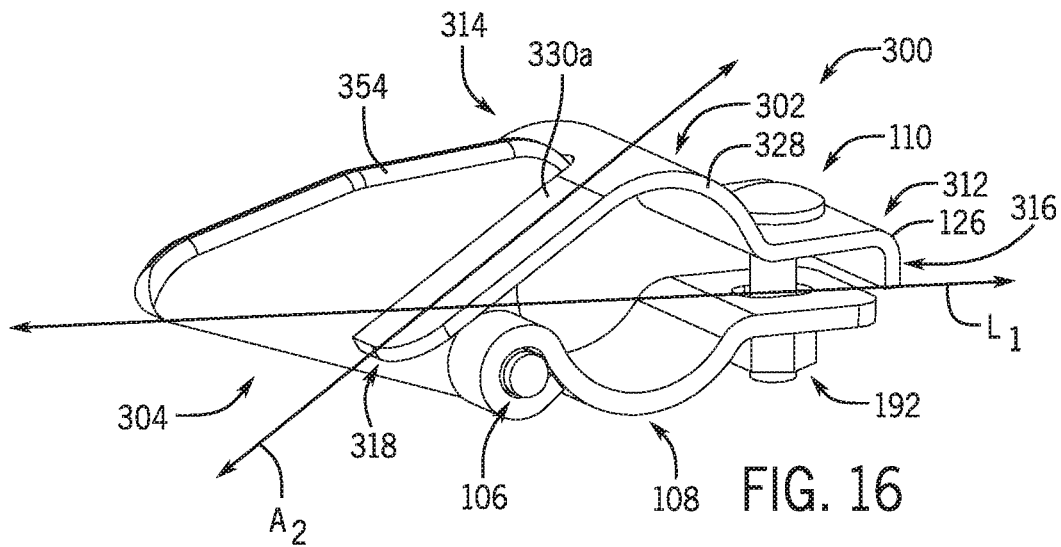
FIG. 16 is a perspective view of one of the external belt guides of FIG. 10.
Figure 17:
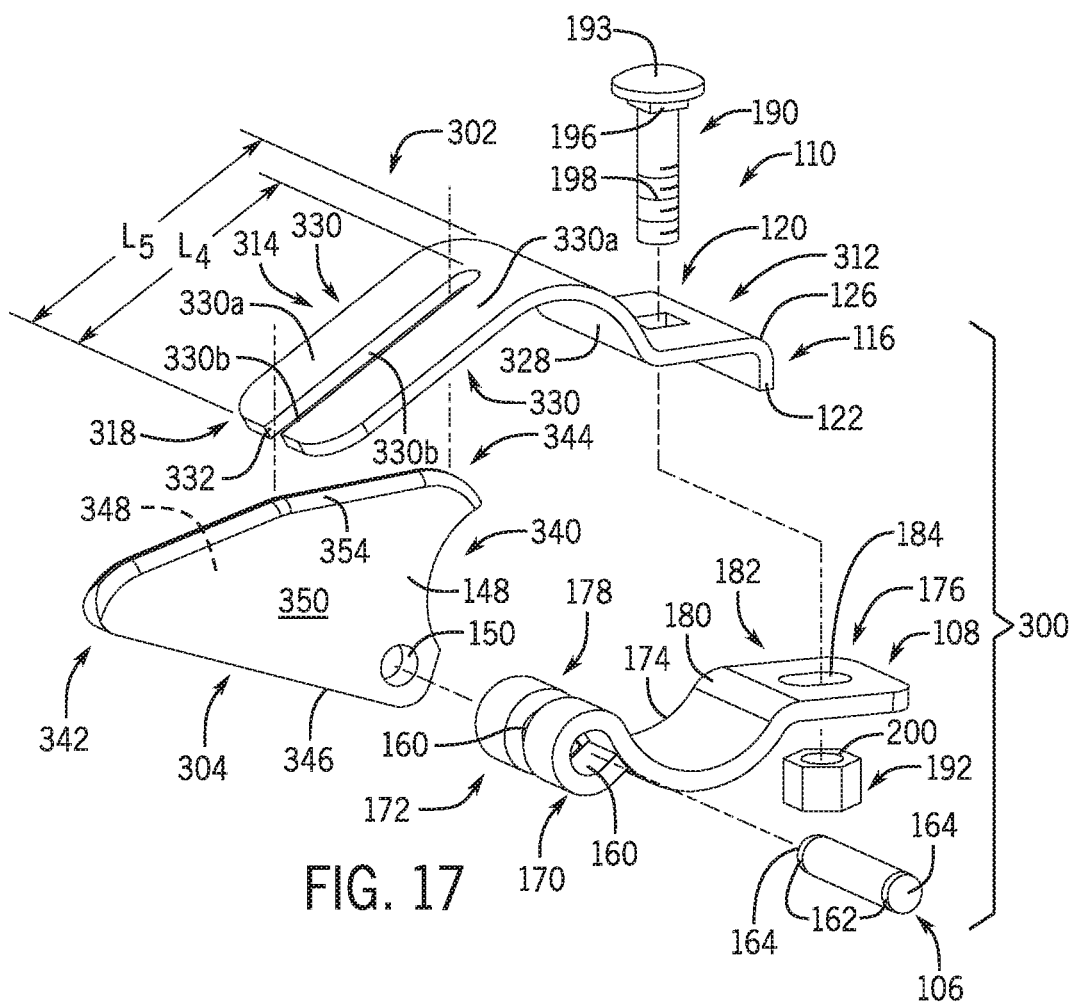
FIG. 17 is an exploded view of the external belt guide of FIG. 16.

With reference to FIG. 16, one of the belt guides 300 is shown in greater detail. As each of the belt guides 300 are the same, only one will be discussed in detail herein with the understanding that the remainder of the belt guides 300 associated with the baler 10 are the same. The belt guide 300 includes a guide body 302, a guide 304, the roll pin 106, the hinge 108 and the fastening assembly 110 (FIG. 17).

The guide body 302 is formed of a metal or metal alloy, and is stamped, machined, cast, forged, etc. In one example, the guide body 302 is composed of a steel, such as A13C steel, however, other metal or metal alloys may be employed. The guide body 302 includes a coupling section 312 and a guide section 314. Generally, the coupling section 312 is defined at a first end 316, and the guide section 314 is defined from a second end 318 to extend toward the first end 316. Briefly, with reference to FIG. 12, when the belt guide 300 is coupled to the first cross-member 50, the second end 318 of the guide section 314 is spaced apart from the belt 32, which provides the belt 32 with an increased area to move or deflect prior to contacting the guide section 314 during a baling operation. In certain instances, contact between the belt 32 and the guide section 314 may result in an undesired movement of the belt guide 300. Thus, by providing an increased area between the belt 32 and the guide section 14 or a clearance C1, the belt 32 may deflect without contacting the belt guide 300. In one example, the clearance C1 is about 45.0 millimeters (mm) to about 55.0 millimeters (mm). In addition, the clearance C1 also allows for a movement or deflection of the roller 34' during a baling operation while reducing a likelihood of contact between the belt 32 and the guide section 314 that results in an undesired movement of the belt guide 300.

With reference back to FIG. 17, the coupling section 312 cooperates with the hinge 108 to couple the belt guide 300 to the first cross-member 50 (FIG. 15). In this example, the coupling section 312 includes the base 120 and the flange 122. The base 120 is substantially planar, and defines the aperture 124 therethrough that receives a portion of the fastening assembly 110 (FIG. 16). In this example, the aperture 124 is substantially rectangular, however, the aperture 124 may have any desired shape that cooperates with the fastening assembly 110 to couple the belt guide 300 to the first cross-member 50 (FIG. 15).

The flange 122 extends from the base 120 at the radius 126, which provides a smooth contact surface for the respective belt 32 and/or wrap material 44. The flange 122 assists in retaining the belt guide 300 on the first cross-member 50 by contacting the hinge 108 when the belt guide 100 is coupled to the first cross-member 50 to clamp the belt guide 100 to the first cross-member 50 (FIG. 15).

A second radius 328 transitions the base 120 to the guide section 314. The second radius 328 is a first point of contact for the respective belt 32 and/or the wrap material 44 (FIG. 12). The second radius 328 generally extends over a radius of curvature that defines a receiving section 329 for receiving a portion of the first cross-member 50 (FIG. 15). The guide section 314 extends from the second radius 328 to the second end 318 of the guide body 302. In one example, the guide section 314 includes two guide fingers 330, which are defined by a slot 332. The guide fingers 330 are defined by the slot 332 such that the guide fingers 330 extend on either side of the guide 304. Generally, the guide fingers 330 of the guide section 314 each extend along an axis A2 that is transverse or oblique to a longitudinal axis L1 defined by the belt guide 300. Thus, a guide surface 330a defined by each of the guide fingers 330 faces the exterior surface 32.2 of the respective belt 32, and is transverse or oblique to the exterior surface 32.1 of the belt 32 (FIG. 12). Stated another way, in this example, the guide section 314 is angled relative to the guide 304 to provide the clearance C1. With reference to FIG. 12, each of the guide fingers 330 of the guide section 314 extends at an angle γ relative to the guide 304. Generally, the angle γ is defined between a top surface 304a of the guide 304 and a guide surface 330a of each of the guide fingers 330 of the guide section 314. In one example, angle γ is about 20 degrees to about 30 degrees.

The guide surface 330a of each of the guide fingers 330 is substantially planar and smooth, and extends from the second radius 328 to the second end 318 of the guide body 302. The guide surface 330a comprises a substantial majority of a surface of the guide section 314, and is a contact surface for the respective belt 32 when the respective belt 32 is un-tensioned. When the belt guide 300 is coupled to the first cross-member 50, the guide surface 330a is positioned proximate the respective belt 32 opposite the bale forming chamber 22 (FIGS. 10 and 11).

The slot 332 is defined through the guide section 314 between the second radius 328 and the second end 318 of the guide body 302. The slot 332 receives a portion of the guide 304. The slot 332 generally extends for a length L4, which is substantially less than a length L5 of the guide surface 330a of each of the guide fingers 330. It should be noted, however, that the length L4 of the slot 132 may extend for the length L5, if desired. In this example, the guide body 302 is coupled to the guide 304 at the slot 332. Stated another way, inner surfaces 330b of each of the guide fingers 330 are proximate the guide 304 when the guide 304 is received within the slot 332, and these inner surfaces 330b may be fixedly coupled to the guide 304 via welding, adhesives, etc.

With reference to FIG. 17, the guide 304 includes a first end 340, a second end 342, a first surface 344, a second surface 346, a first side 348 and a second side 350. The guide 304 is formed of a metal or metal alloy, and is stamped, machined, cast, forged, etc. In one example, the guide 304 is composed of a steel, such as a heat treated 1045 steel, however, other metal or metal alloys may be employed. The first end 340 includes the arcuate portion 148 and defines the bore 150. The arcuate portion 148 is substantially concave, and is configured to mate with the cylindrical shape of the first cross-member 50 (FIG. 14). The bore 150 is defined through the guide 304 at the first end 340 so as to be adjacent to or near the second surface 346. The bore 150 is sized to receive the roll pin 106 therethrough to couple the roll pin 106 to the guide 304.

The second end 342 is rounded and is substantially opposite the first end 340. The second end 342 is adjacent to or in close proximity to the roller 34', which inhibits the accumulation of crop material between the belt guide 300 and the roller 34' (FIG. 12). As discussed, in this example, the second end 342 is spaced the distance D3 from the roller 34'. The second end 342 generally has a downward curvature or taper, which reduces friction between the second end 342 and the wrap material 44. The first surface 344 is defined between the first end 340 and the second end 342. The first surface 344 defines a guide protrusion 354. The guide protrusion 354 extends along the first surface 344 from the first end 340 to the second end 342 and defines the top surface 304a of the guide 304. The guide protrusion 354 is arcuate in shape, and has a curved surface. The guide protrusion 354 is machined to have no sharp edges. Generally, the guide protrusion 354 is also polished so that in the instance the respective belt 32 and/or the wrap material 44 passes over the guide protrusion 354, the respective belt 32 and/or the wrap material 44 is not damaged by the guide protrusion 354. With reference to FIG. 13A, the guide protrusion 354 generally extends for a distance D4 beyond the second radius 328 of the guide body 302 and may contact the edges 32.2 of the respective belt 32 and/or the wrap material 44 to direct the respective belt 32 and/or the wrap material 44. Generally, when the belt guide 300 is coupled to the first cross-member 50, the guide protrusion 354 is positioned between adjacent edges 32.2 of the respective adjacent belts 32 and does not extend beyond an inner surface 32.3 of the respective belt 32. In addition, when the belt guide 300 is coupled to the first cross-member 50, the guide protrusion 354 extends inwardly toward the bale forming chamber 22 proximate the edge 32.2 of the respective belt 32. The guide protrusion 354 cooperates with the second radius 328 of the guide body 302 to guide the respective one of the belts 32 and/or the wrap material 44 into the bale forming chamber 22, while preventing or inhibiting the accumulation of crop material between the respective one of the belts 32 and the belt guide 300.

In one example, with reference to FIG. 13A, the guide protrusion 354 also extends the distance D4 beyond the surface 48' of the rail 48. The belt guide 300 is coupled to the first cross-member 50 so that the belt guide 300 is positioned adjacent to the exterior surface 32.1 of the respective belt 32, and the guide protrusion 354 extends beyond the exterior surface 32.1 of the respective belt 32 into the gap 33 defined between adjacent ones of the belts 32. Thus, in this example, the guide protrusion 354 extends inwardly into the gap 33 so as to be positioned beside respective edges 32.2 of the adjacent ones of the belts 32. The belt guide 300 is coupled to the first cross-member 50 so as to be proximate to the exterior surface 32.1 of the respective belt 32, and so that the guide protrusion 354 extends into the gap 33 between the adjacent ones of the belts 32. This further assists in directing the respective belt 32 and/or the wrap material 44 into the bale forming chamber 22. It should be noted that in instances in which the wrap feed and cut-off system 42 is supplying the wrap material 44 into the bale forming chamber 22, the wrap material 44 extends over the guide protrusion 354 within the gap 33 (FIG. 13A). In addition, it should be noted that in instances in which the wrap feed and cut-off system 42 is not supplying the wrap material 44 into the bale forming chamber 22, the guide protrusion 354 extends within the gap 33 so as to be positioned adjacent to the edges 32.2 of the respective belts 32 (FIG. 13A) and the guide surfaces 330a are proximate the exterior surface 32.1 of the respective belts 32.

With reference back to FIG. 17, the second surface 346 is substantially opposite the first surface 344. The second surface 346 tapers from the first end 340 to the second end 342. Stated another way, the second surface 346 extends along an axis that is substantially transverse or oblique to the longitudinal axis L1 of the belt guide 300 (FIG. 16). The tapered shape of the second surface 346 provides a reduced profile for the belt guide 300 when viewed from a rear or bottom surface of the first cross-member 50 (FIG. 14).

The first side 348 is opposite the second side 350. The first side 348 is coupled to one of the guide fingers 330, and the second side 350 is coupled to the other of the guide fingers 330 to fixedly couple the guide 304 to the guide body 302. In one example, the first side 348 and the second side 350 are welded to the inner surfaces 330b of each of the guide fingers 330. For example, the guide 304 and the guide body 302 are welded together through a suitable welding process, such as stick welding, MIG welding, flux wire welding, TIG welding, resistance spot welding, etc. Generally, the guide body 302 is coupled to the guide 304 so as to be on opposite sides of the guide protrusion 354.

The roll pin 106 is received through the bore 150 defined in the guide 304, and the through bores 160 defined through the hinge 108 to couple the hinge 108 to the guide 304. Generally, the roll pin 106 is press-fit into the bore 150 to couple the roll pin 106 to the guide 304. The roll pin 106 movably or pivotally couples the hinge 108 to the guide 304.

The hinge 108 includes the first knuckle 170, the second knuckle 172, the arcuate section 174 and the mounting section 176. The first knuckle 170 is spaced apart from the second knuckle 172 at the first end 178 of the hinge 108. The first knuckle 170 and the second knuckle 172 each define the through bore 160, which receives the roll pin 106. Generally, with brief reference to FIG. 13A, the first knuckle 170 is spaced apart from the second knuckle 172 by the distance D2, which is at least equal to or greater than a width W1 of the guide 304 such that the guide 304 may be received between the first knuckle 170 and the second knuckle 172. The arcuate section 174 is defined adjacent to the first knuckle 170 and the second knuckle 172, and extends from the first knuckle 170 and the second knuckle 172 to the mounting section 176. The arcuate section 174 is substantially concave and has a radius configured to mate with the cylindrical first cross-member 50 (FIG. 14). The arcuate section 174 transitions to the mounting section 176 at the fourth radius 180. The mounting section 176 extends from the fourth radius 180 to the second end 182 of the hinge 108. The mounting section 176 defines the bore 184, which cooperates with a portion of the fastening assembly 110. The bore 184 is defined through the mounting section 176 between the fourth radius 180 and the second end 182.

The fastening assembly 110 couples the belt guide 300 to the first cross-member 50 (FIG. 15). In this example, the fastening assembly 110 includes the bolt 190 and the nut 192. It will be understood, however, that various other fastening devices may be employed to removably couple the belt guide 300 to the first cross-member 50, such as cotter pins, etc. The rectangular key 196 may be defined adjacent to the head 193 to assist in positioning the bolt 190 through the aperture 124. The shank 194 is at least partially threaded, and includes the plurality of threads 198 that mate with a corresponding plurality of threads 200 defined within the nut 192 to couple the belt guide 300 to the first cross-member 50.

With each of the guide body 302, the guide 304, the roll pin 106 and the hinge 108 formed, the belt guide 300 is assembled. In one example, the guide 304 is received through the slot 332. With the guide 304 received in the slot 332, the inner surfaces 330b of each of the guide fingers 330 are coupled to the respective one of the first side 348 and the second side 350, via welding, for example. The hinge 108 is positioned about the guide 104, such that the bores 160 are coaxially aligned with the bore 150. The roll pin 106 is inserted through one of the bores 160 and press-fit to the guide 104, such that each of the first knuckle 170 and the second knuckle 172 are supported for rotation relative to the guide 104 by the roll pin 106. Thus, the hinge 108 is coupled to the guide 104 at the first end 178.

With the belt guide 300 assembled, with reference to FIG. 15, the belt guide 300 is coupled to the first cross-member 50 of the pre-assembled baler 10 such that the first cross-member 50 is received between the arcuate portion 148 of the guide 304, the arcuate section 174 of the hinge 108 and a portion of the receiving section 329 at the second radius 328. Stated another way, the receiving section 329 at the second radius 328 cooperates with the arcuate portion 148 and the arcuate section 174 to define a substantially circular opening that receives the first cross-member 50. In other words, the hinge 108 has the second end 182 that cooperates with the guide 304 and the guide body 302 to receive a portion of the baler 10 or the first cross-member 50 to couple the belt guide 300 to the baler 10 such that the belt guide 300 is positioned external to the bale forming chamber 22 (FIG. 10).

With the belt guide 300 positioned about the first cross-member 50, the belt guide 300 may be adjusted forward/rearward, left/right and up/down as needed to ensure the belt guide 300 contacts the respective belt 32 when the belts 32 are not tensioned. With the belt guide 300 in the desired position, the bolt 190 is inserted into the aperture 124 and through the bore 184. The nut 192 threadably engages with the bolt 190 to couple the belt guide 300 to the first cross-member 50. The bolt 190 and/or nut 192 may be tightened until a desired or predetermined clamp force is reached. This process may be repeated any number of times until the desired or predetermined number of belt guides 300 are coupled to the first cross-member 50.

With the predetermined number of belt guides 300 coupled to the first cross-member 50, the guide protrusion 354 and the guide surface 330a of each of the guide fingers 330 of the belt guides 300 may contact respective one of the belts 32 in instances where the respective belts 32 are not under tension. The contact between the guide protrusion 154 and the guide surface 330a of the guide fingers 330 maintains the respective belts 32 in the desired orientation and position for resuming operation for forming a bale. The position of the belt guides 300 as external to the bale forming chamber 22 ensures that crop material does not accumulate between the belts 32 and/or the belt guides 300, and maintains the belt guides 300 at an optimum working temperature (through the reduction of friction that may be caused by accumulated crop material). This further ensures that when the wrap material 44 is fed from the wrap feed and cut-off system 42, the wrap material 44 is not damaged by the belt guides 300. Moreover, the guide protrusion 354 of each of the guides 304 cooperates to direct the wrap material 44 along the belts 32 and into the bale forming chamber 22 to secure a formed bale B (FIG. 1). Further, by positioning the second end 342 of the guide 304 the distance D3 (FIG. 12) from the roller 34', the accumulation of crop between the roller 34', the respective belt 32 and the belt guide 300 is reduced. Moreover, the clearance C1 (FIG. 12) between the guide surfaces 330a of each of the guide fingers 330 and the respective belts 32 enables the belts 32 and/or the roller 34' to move or deflect during a bale forming operation without contacting the belt guide 300.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A belt guide for a baler having a bale forming chamber with at least one belt to form a bale of crop material and having a wrap feed system, the belt guide comprising:
   a guide body including a belt- or wrap material-contacting guide surface and a guide including a guide protrusion that extends through an opening in the guide body inwardly toward the bale forming chamber proximate an edge of the at least one belt;
   wherein the belt guide is coupled to the baler external to the bale forming chamber; and
   wherein, when the wrap feed system is supplying wrap material into the bale forming chamber, the belt guide is configured so that the wrap material extends over the guide protrusion between the guide protrusion and the edge of the at least one belt.

2. The belt guide of claim 1, wherein the guide is coupled to the guide body.

3. The belt guide of claim 2, wherein the guide protrusion extends a distance above the guide surface.

4. The belt guide of claim 2, wherein the guide surface is oblique to a surface of the at least one belt.

5. The belt guide of claim 4, wherein a clearance is defined between the at least one belt and the guide surface.

6. The belt guide of claim 2, further comprising a hinge coupled to the guide at a first end, the hinge having a second end that cooperates with the guide and the guide body to receive a portion of the baler to couple the belt guide to the baler.

7. The belt guide of claim 6, wherein the guide body includes a coupling portion, and the hinge includes a mounting portion at the second end that cooperates with the coupling portion to couple the belt guide to the portion of the baler.

8. The belt guide of claim 7, wherein the portion of the baler is a cross-member associated with the wrap feed system.

9. The belt guide of claim 2, wherein the guide surface comprises two guide surfaces and the guide has opposed sides, with one of the guide surfaces on each side of the guide.

10. A baler comprising:
    a bale forming chamber having at least one belt to form a bale of crop material;
    a wrap feed system; and
    a belt guide coupled to the baler so as to be external to the bale forming chamber, the belt guide including a guide body including a belt- or wrap material-contacting guide surface and a guide with a guide protrusion that extends through an opening in the guide body inwardly toward the bale forming chamber proximate an edge of the at least one belt;
    wherein, when the wrap feed system is supplying wrap material into the bale forming chamber, the wrap material extends over the guide protrusion between the guide protrusion and the edge of the at least one belt.

11. The baler of claim 10, wherein the guide is coupled to the guide body.

12. The baler of claim 11, wherein the guide protrusion extends a distance above the guide surface.

13. The baler of claim 11, wherein the guide surface is oblique to an exterior surface of the at least one belt.

14. The baler of claim 13, wherein a clearance is defined between the exterior surface of the at least one belt and the guide surface.

15. The baler of claim 11, wherein the belt guide further comprises a hinge coupled to the guide at a first end, the hinge having a second end that cooperates with the guide and the guide body to receive a portion of the baler to couple the belt guide to the baler and the portion of the baler is a cross-member associated with the wrap feed system.

16. The baler of claim 11, wherein the guide surface comprises two guide surfaces and the guide has opposed sides, with one of the guide surfaces on each side of the guide.

17. The baler of claim 11, wherein the at least one belt is supported on at least one belt support member, and the belt guide is coupled to the portion of the baler such that an end of the guide is adjacent to the at least one belt support member.

18. A baler comprising:
    a bale forming chamber having a plurality of belts to form a bale of crop material, the plurality of belts supported on at least one belt support member, with a gap defined between adjacent belts of the plurality of belts;

a wrap feed system; and a belt guide coupled to the baler, the belt guide coupled to the baler external to the bale forming chamber, the belt guide including:

a guide including a guide protrusion that extends into one of the gaps defined between adjacent belts of the plurality of belts and inward toward the bale forming chamber, the guide proximate edges of the respective adjacent belts of the plurality of belts; and a guide body having a belt- or wrap material-contacting guide surface positioned proximate the respective adjacent belts of the plurality of belts opposite the bale forming chamber, the guide protrusion extends through an opening in the guide body a distance above the guide surface;

wherein, when the wrap feed system is supplying wrap material into the bale forming chamber, the wrap material extends over the guide surface and extends over the guide protrusion within the gap.

19. The baler of claim 18, wherein a clearance is defined between the exterior surface each of the respective adjacent belts of the plurality of belts and the guide surface.

20. The baler of claim 18, wherein the guide surface comprises two guide surfaces and the guide has opposed sides, with one of the guide surfaces coupled to each side of the guide.

* * * * *

UNITED STATES PATENT AND TRADEMARK OFFICE
CERTIFICATE OF CORRECTION

PATENT NO. : 11,039,575 B2  
APPLICATION NO. : 16/020045  
DATED : June 22, 2021  
INVENTOR(S) : Pilcher et al.

Page 1 of 1

It is certified that error appears in the above-identified patent and that said Letters Patent is hereby corrected as shown below:

In the Claims

In Column 21, Claim 19, Line 21, delete "surface each" and insert -- surface of each --, therefor.

Signed and Sealed this
Fifteenth Day of February, 2022

Drew Hirshfeld
*Performing the Functions and Duties of the
Under Secretary of Commerce for Intellectual Property and
Director of the United States Patent and Trademark Office*